United States Patent
Junkin et al.

(10) Patent No.: US 11,714,917 B2
(45) Date of Patent: Aug. 1, 2023

(54) SYSTEMS AND METHODS FOR ANONYMIZING SENSITIVE DATA AND SIMULATING ACCELERATED SCHEDULE PARAMETERS USING THE ANONYMIZED DATA

(71) Applicant: A Day Early, Inc., Soda Springs, CA (US)

(72) Inventors: Donald Junkin, Kingvale, CA (US); Sethmi Kachchakaduge, Davis, CA (US); Alexander Knudson, Reno, NV (US); Alexander Geis, Manhasset, NY (US)

(73) Assignee: A Day Early, Inc., Soda Springs, CA (US)

( * ) Notice: Subject to any disclaimer, the term of this patent is extended or adjusted under 35 U.S.C. 154(b) by 232 days.

(21) Appl. No.: 17/179,944

(22) Filed: Feb. 19, 2021

(65) Prior Publication Data
US 2021/0264058 A1 Aug. 26, 2021

Related U.S. Application Data

(60) Provisional application No. 62/979,290, filed on Feb. 20, 2020.

(51) Int. Cl.
*G06F 21/62* (2013.01)
*H04L 9/40* (2022.01)
(Continued)

(52) U.S. Cl.
CPC ...... *G06F 21/6254* (2013.01); *G06F 16/2379* (2019.01); *G06Q 10/067* (2013.01); *G06Q 40/03* (2023.01); *H04L 63/0421* (2013.01)

(58) Field of Classification Search
CPC ............ G06F 21/6254; G06F 16/2379; G06F 21/6245; G06Q 40/03; G06Q 10/067; H04L 63/0421
See application file for complete search history.

(56) References Cited

U.S. PATENT DOCUMENTS 8,444,418 B1 * 5/2013 Buten .................... G06Q 40/00
434/110
9,305,181 B1 * 4/2016 Watson, III .......... G06Q 20/382
(Continued)

FOREIGN PATENT DOCUMENTS

WO WO-2021/168346 8/2021

OTHER PUBLICATIONS

PCT/US2021/018903, International Search Report and Written Opinion dated May 7, 2021, 6 pages.
(Continued)

*Primary Examiner* — Malcolm Cribbs
(74) *Attorney, Agent, or Firm* — Cooley LLP

(57) ABSTRACT

An apparatus includes a memory, a communication interface in communication with a network, a first processor, and a second process different from the first processor. The first processor configured to receive data from a user device and to separate the data into a first data set including metadata associated with a user of the user device and a second data set including anonymized data associated with a set of actions to be performed on a predetermined schedule. The second processor is configured to receive the second data set from the first processor and a user input associated with a selection of a simulation and at least one additional action otherwise not included in the set of actions. The second processor configured to perform the simulation using the second data set to simulate an acceleration of the predetermined schedule as a result of the at least one additional action.

20 Claims, 6 Drawing Sheets

(51) Int. Cl.
   *G06F 16/23*   (2019.01)
   *G06Q 10/067*  (2023.01)
   *G06Q 40/03*   (2023.01)

(56) References Cited

U.S. PATENT DOCUMENTS

| | | |
|---|---|---|
| 10,417,556 B1 | 9/2019 | Fairbank et al. |
| 2006/0074795 A1* | 4/2006 | Maharaj ................. G06Q 40/03 |
| | | 705/38 |
| 2009/0210339 A1* | 8/2009 | Bhagwat ................ G06Q 40/00 |
| | | 705/38 |
| 2011/0153351 A1* | 6/2011 | Vesper ................... G16H 30/20 |
| | | 705/2 |
| 2014/0074689 A1 | 3/2014 | Lund et al. |
| 2015/0262246 A1 | 9/2015 | Stack et al. |
| 2017/0228820 A1 | 8/2017 | Rohn et al. |
| 2017/0353302 A1* | 12/2017 | Fernandez ............ H04L 1/0075 |
| 2019/0222560 A1 | 7/2019 | Ford et al. |

OTHER PUBLICATIONS

"Power Set: Properties." Wikipedia, Wikimedia Foundation. Aug. 9, 2021. https://en.wikipedia.org/wiki/Power_set#Properties.

* cited by examiner

SYSTEMS AND METHODS FOR ANONYMIZING SENSITIVE DATA AND SIMULATING ACCELERATED SCHEDULE PARAMETERS USING THE ANONYMIZED DATA

CROSS-REFERENCE TO RELATED APPLICATIONS

This application claims priority to and the benefit of U.S. Provisional Patent Application No. 62/979,290, filed Feb. 20, 2020, entitled "Loan Amortization Methodology and Websites Describing the Same," the disclosure of which is incorporated herein by reference in its entirety.

BACKGROUND

Embodiments described herein relate to the performance of scheduled actions and more specifically, to systems and methods for anonymizing sensitive data and simulating accelerated schedule parameters using the anonymized data.

Increases in the use and capabilities of computing devices has, among other things, led to the storage, analysis, and/or transmission of data from a large number of data sources. In some instances, it may be desirable to use at least a portion of data that includes, in addition to the desired data, sensitive and/or personally identifying information (PII). For example, in some instances, it may be desirable to analyze data associated with one's performance of scheduled actions (e.g., actions performed at predetermined intervals such as scheduled payments and/or the like). The data, however, frequently includes sensitive information and/or PII that may expose the owner or generator of that information to undue risk and/or that may otherwise be protected by law or regulation. Accordingly, a need exists for anonymizing sensitive data. A need also exists for the use of the anonymized data to simulate accelerated schedule parameters and/or the like such as, for example, accelerated payment schedules, etc.

SUMMARY

In some embodiments, an apparatus includes a memory, a communication interface configured to send and receive data via a network, a first processor, and a second process different from the first processor. The first processor configured to receive, via the communication interface and the network, data from a user device and to separate the data into a first data set and a second data set. The first data set includes metadata associated with the user of the user device and at least a portion of the second data set includes anonymized data associated with a set of actions to be performed on a predetermined schedule. The second processor is configured to receive the second data set from the first processor and a user input associated with a selection of a simulation from a plurality of simulations and at least one additional action otherwise not included in the set of actions to be performed on the predetermined schedule. The second processor configured to perform the simulation from the plurality of simulations using the second data set. The simulation from the plurality of simulations configured to simulate an acceleration of the predetermined schedule as a result of the at least one additional action.

DETAILED DESCRIPTION

Figure 1:
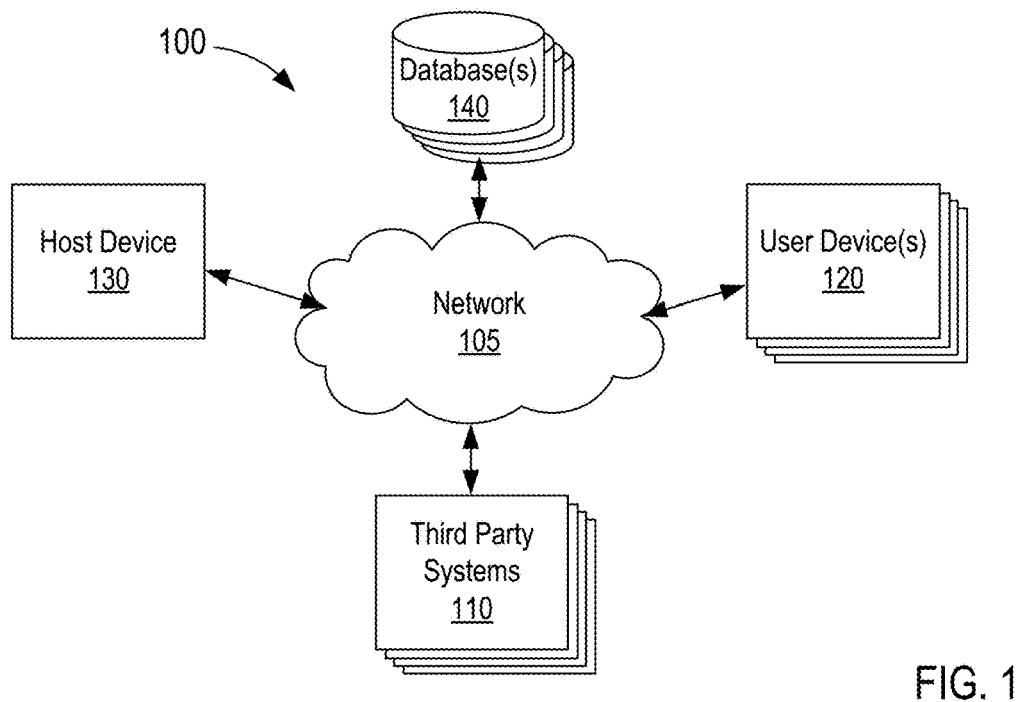
FIG. 1 is a schematic illustration of a system for anonymizing sensitive data and simulating accelerated schedule parameters using the anonymized data, according to an embodiment.

Embodiments and/or methods and implementations described herein relate to systems and methods for anonymizing sensitive data and simulating accelerated schedule parameters using the anonymized data. In some embodiments, an apparatus includes a memory, a communication interface configured to send and receive data via a network, a first processor, and a second process different from the first processor. The first processor configured to receive, via the communication interface and the network, data from a user device and to separate the data into a first data set and a second data set. The first data set includes metadata associated with the user of the user device and at least a portion of the second data set includes anonymized data associated with a set of actions to be performed on a predetermined schedule. The second processor is configured to receive the second data set from the first processor and a user input associated with a selection of a simulation from a plurality of simulations and at least one additional action otherwise not included in the set of actions to be performed on the predetermined schedule. The second processor configured to perform the simulation from the plurality of simulations using the second data set. The simulation from the plurality of simulations configured to simulate an acceleration of the predetermined schedule as a result of the at least one additional action.

In some embodiments, a non-transitory processor-readable medium storing code representing instructions to be executed by a first processor and a second processor different from the first processor includes code to cause the first processor to receive data from a user device via a network and to separate the data into a first data set and a second data set. The first data set includes metadata associated with a user of the user device and at least a portion of the second data set includes anonymized data associated with a set of actions to be performed on a predetermined schedule. The instructions further include code to cause the second processor to receive (i) the second data set from the first processor and (ii) a user input associated with a selection of a simulation from a plurality of simulations and at least one additional action otherwise not included in the set of actions to be performed on the predetermined schedule. The instructions further include code to cause the second processor to perform the simulation from the plurality of simulations using the second data set. The simulation from the plurality of simulations is configured to simulate an acceleration of the predetermined schedule as a result of the at least one additional action.

In some embodiments, a method includes receiving, at a first processor and via a network, data from a user device. The data is separated into a first data set including metadata associated with a user of the user device and a second data set including anonymized data associated with a set of actions to be performed on a predetermined schedule. The second data set is sent from the first processor to the second processor. The second processor receives a user input associated with a selection of a simulation from a set of simulations and at least one additional action otherwise not included in the set of actions to be performed on the predetermined schedule. The second processor performs the simulation from the set simulations using the second data set to simulate an acceleration of the predetermined schedule as a result of the at least one additional action.

Detailed embodiments of the present disclosure are disclosed herein for purposes of describing and illustrating claimed structures and methods that may be embodied in various forms and are not intended to be exhaustive in any way or limited to the disclosed embodiments. Modifications and variations will be apparent without departing from the scope of the disclosed embodiments to those skilled in the art. The terminology used herein was chosen to best explain the principles of the one or more embodiments, practical applications, or technical improvements over current technologies, or to enable understanding of the embodiments disclosed herein. As described, details of well-known features and techniques may be omitted to avoid unnecessarily obscuring the embodiments of the present disclosure.

As used in this specification, the singular forms "a," "an" and "the" include plural referents unless the context clearly dictates otherwise. Thus, for example, the term "a module" is intended to mean a single module or a combination of modules, "a network" is intended to mean one or more networks, or a combination thereof.

As used herein the term "or" when used without a preceding "either" (or other similar language indicating that "or" is unequivocally meant to be exclusive—e.g., only one of x or y, etc.) shall be interpreted to be inclusive (e.g., "x or y" means one or both x or y). The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms "have," "having," "include," and "including" should be interpreted to be synonymous with the terms "comprise" and "comprising." The use of these terms should also be understood as disclosing and providing support for narrower alternative implementations where these terms are replaced by "consisting" or "consisting essentially of."

As used herein the term "personally identifying information" refer to any data that are associated with an identity of an individual or an object. In some instances, such personally identifying information can be protected and/or anonymized to avoid revealing the identity of the individual or the object while allowing further tasks to be performed on or using at least a portion of the anonymized information.

Unless otherwise indicated, all numbers or expressions, such as those expressing dimensions, physical characteristics, and the like, used in the specification (other than the claims) are understood to be modified in all instances by at least one of the terms "approximately," "about," "substantially," and/or the like. At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

Electronic devices are described herein that can include any suitable combination of components configured to perform any number of tasks. Components, modules, elements, engines, etc., of the electronic devices can refer to any assembly, subassembly, and/or set of operatively-coupled electrical components that can include, for example, a memory, a processor, electrical traces, optical connectors, software (executing in hardware), and/or the like. For example, an electronic device and/or a component of the electronic device can be any combination of hardware-based components, modules, and/or engines (e.g., a field-programmable gate array (FPGA), an application specific integrated circuit (ASIC), a digital signal processor (DSP)), and/or software-based components and/or modules (e.g., a module of computer code stored in memory and/or executed at the processor) capable of performing one or more specific functions associated with that component and/or otherwise tasked to that electronic device.

FIG. 1 is a schematic illustration of a system 100 for anonymizing sensitive data, simulating accelerated schedule parameters using the anonymized data, and performing one or more actions in accordance with the simulation, according to an embodiment. At least a portion of the system 100 can be, for example, represented and/or described by a set of instructions or code stored in a memory and executed in a processor of one or more electronic devices (e.g., a host device, a server or group of servers, a personal computer (PC), a network device, a user device, a client device, and/or the like). In some implementations, the system 100 can be used to calculate and/or determine information associated with amortized loans, simulate various scenarios associated with accelerating the repayment of amortized loans, and/or provide a platform for borrowers (users) to make loan payments including regularly scheduled payments and/or payments in addition to the regularly scheduled payments (e.g., that get applied to the principal) at a predetermined and/or desired time that can, for example, reduce an amount of interest paid over the term of the loan and/or reduce a term of the loan.

The system 100 includes a host device 130 in communication with one or more database(s) 140, one or more user device(s) 120, and one or more third party system(s) 110. The host device 130 can be any suitable host device and/or compute device such as a server or group of servers, a network management device, a personal computer (PC), a processing unit, and/or the like. For example, in this embodiment, the host device 130 can be a server or group of servers (disposed in substantially the same location and/or facility or distributed in more than one location) in electronic communication with the database 140, the user device(s) 120, and the third party systems 110 via a network 105, as described in further detail herein.

The third party system(s) 110 can be any suitable systems, devices, network, etc. configured to provide goods and/or services to users for the user devices 120. For example, the third party system(s) 110 can be any number of commercial businesses, banks, financial institutions, lenders, credit lenders, credit card providers, employers, and/or the like. In some instances, the third party system(s) 110 can be any suitable system, company, entity, etc. that can establish, define, and/or otherwise agree to a relationship with one or more of the users of the user devices 120 that can include and/or obligate the user of the respective user device 120 to perform scheduled actions or to have scheduled interactions with the third party (and by extension, the third party system 110).

By way of example, the third party system(s) 110 can be and/or can include one or more financial institutions, banks, and/or lenders that can extend credit, loans, and/or resources to one or more of the users of the user devices 120. In some implementations, the third party is a lender that has given an amortized loan to a user of a user device 120 (also referred to herein as a "borrower," "consumer," and/or the like) in consideration of repayment of the loan on a scheduled basis. In such implementations, the third party system 110 is any system, device, network, platform, application programming interface (API), etc. owned, operated, and/or controlled by the third party. For example, the third party system 110 can be an API or web-based interface allowing for interaction with one or more internal systems of the third party such as, for example, online bill pay, automatic deposit system, automatic payment or withdrawal system, and/or the like. In some implementations, the third party system 110 can be implemented on any suitable computing device that is in communication with the network 105. In some implementations, the third party system(s) 110 can be implemented as a standalone application that is, for example, stored in a memory and executed in a processor or can be embedded (e.g., by way of a software development kit (SDK)) in an application provided by the specific third party system 110, the host device 130, and/or any other suitable device in communication with the network 105.

The network 105 can be any type of network or combination of networks such as, for example, a local area network (LAN), a wireless local area network (WLAN), a virtual network (e.g., a virtual local area network (VLAN)), a wide area network (WAN), a metropolitan area network (MAN), a worldwide interoperability for microwave access network (WiMAX), a telephone network (such as the Public Switched Telephone Network (PSTN) and/or a Public Land Mobile Network (PLMN)), an intranet, the Internet, an optical fiber (or fiber optic)-based network, a cellular network, digital cellular telephone connection, Cellular Digital Packet Data (CDPD) connection, digital satellite data connection, a virtual private network (VPN), and/or any other suitable network. The network 105 can be implemented as a wired and/or wireless network. By way of example, the network 105 can be implemented as a WLAN based on the Institute of Electrical and Electronics Engineers (IEEE) 802.11 standards (also known as "WiFi®"). Moreover, the network 105 can include a combination of networks of any type such as, for example, a LAN or WLAN and the Internet. In some implementations, communication (e.g., between the host device 130, the user device(s) 120, and/or the third party systems 110) can be established via the network 105 and any number of intermediate networks and/or alternate networks (not shown), which can be similar to or different from the network 105. As such, data can be sent to and/or received by devices, databases, systems, etc. using multiple communication modes (e.g., associated with any suitable network(s) such as those described above) that may or may not be transmitted using a common network. For example, in some implementations, the user device(s) 120 can be a mobile telephone (e.g., smartphone) connected to the host device 110 via a cellular network and the Internet (e.g., the network 105).

Each user device 120 can be any suitable compute device such as a PC, a laptop, a convertible laptop, a tablet, a personal digital assistant (PDA), a smartphone, a wearable electronic device (e.g., a smart watch, etc.), a mobile device, a smart hub or speaker, and/or the like. In some implementations, the user devices 120 include consumer electronics. A discussion of one user device 120 is provided below. It should be understood, however, that the system 100 can include any number of user devices 120 that can be similar in at least form and/or function as the user device 120 described below.

For example, the user device 120 can include at least a memory, a processor, a communication interface, an output device, and one or more input devices, each of which can be in communication, connected, and/or otherwise electrically coupled to each other such as to allow signals to be sent therebetween (e.g., via a system bus, electrical traces, electrical interconnects, and/or the like). The memory of the user device 120 can be a random access memory (RAM), a memory buffer, a hard drive, a read-only memory (ROM), an erasable programmable read-only memory (EPROM), an electrically erasable programmable read-only memory (EEPROM), a flash memory or other suitable solid state nonvolatile computer storage medium, and/or the like. In some instances, the memory includes a set of instructions or code (e.g., executed by the processor) used to perform one or more actions associated with, among other things, communicating with the network 105, executing one or more programs and/or applications, and/or one or more actions associated with interacting with the system 100 and/or host device 130, requesting and/or presenting simulations, providing electronic instructions associated sending or receiving digital payment information, and/or the like, as described in further detail herein.

The processor can be any suitable processing device configured to run or execute a set of instructions or code (e.g., stored in the memory). For example, the processor can be a general-purpose processor (GPP), a central processing unit (CPU), an accelerated processing unit (APU), a graphics processor unit (GPU), a field programmable gate array (FPGA), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like. In some instances, the processor can execute a set of instructions or code stored in the memory associated with transmitting signals and/or data between the user device 120, the host device 130, and/or the third party systems 110 via the network 105. Moreover, in some instances, the processor can execute a set of instructions received from the host device 130 associated with providing to the user of the user device 120 any suitable information associated with one or more simulations, loan details, and/or parameters, recommendations, etc. In some implementations, at least the memory and the processor can be included in and/or can form at least a portion of a System on Chip (SoC) integrated circuit.

The communication interface of the user device 120 can be any suitable module, component, engine, and/or device that can place the user device 120 in communication with the network 105 such as one or more network interface cards and/or the like. Such a network interface card can include, for example, an Ethernet port, a universal serial bus (USB) port, a WiFi® radio, a Bluetooth® radio, a near field communication (NFC) radio, a cellular radio, and/or the like. Moreover, the communication interface can be electrically connected to the memory and the processor (e.g., via a system bus and/or the like). As such, the communication interface can send signals to and/or receive signals from the processor associated with electronically communicating with the network 105 (e.g., with the host device 130, one or more other user devices 120, and/or the third party systems 110 via the network 105).

The output device of the user device 120 can be any suitable device configured to provide an output resulting from one or more processes being performed on or by the user device 120. For example, in some implementations, the output device is a display such as, for example, a cathode ray tube (CRT) monitor, a liquid crystal display (LCD) monitor, a light emitting diode (LED) monitor, and/or the like that can graphically represent data and/or any suitable portion of the system 100. In some implementations, the processor can execute a set of instructions to cause the display to graphically represent media data, a graphical user interface (GUI) associated with a webpage, PC application, mobile application, and/or the like. For example, in some instances, the display can graphically represent a PC or mobile application, which in turn, presents schedule data, loan data, simulation data, recommendation data, notification data, and/or the like (e.g., generated by the user device 120 or received from the host device 130 and/or third party systems 110 via the network). In some implementations, the output device can be a display that includes a touch screen configured to receive a tactile and/or haptic tactile user input. In some instances, such a display can be configured to graphically represent data associated with any suitable PC application, mobile application, imaging and/or recording device, and/or one or more notifications that may or may not be associated with a PC or mobile application. In other implementations, the output device can be configured to provide any suitable output such as, for example, an audio output, a tactile or haptic output, a light output, and/or any other suitable output.

The input device(s) of the user device 120 can be any suitable module, component, and/or device that can receive, capture, and/or record one or more inputs (e.g., user inputs) and that can send signals to and/or receive signals from the processor associated with the one or more inputs. In some implementations, the input device(s) can be and/or can include ports, plugs, and/or other interfaces configured to be placed in electronic communication with a device. For example, such an input device can be a USB port, an Institute of Electrical and Electronics Engineers (IEEE) 1394 (FireWire) port, a Thunderbolt port, a Lightning port, and/or the like. In some implementations, a touch screen or the like of a display (e.g., the output device) can be an input device configured to receive a tactile and/or haptic user input. In some implementations, an input device can be a camera and/or other recording device capable of capturing and/or recording media data such as images, video recordings, audio recordings, and/or the like (referred to generally as a "camera"). For example, in some embodiments, such a camera can be integrated into the user device 120 (e.g., as in smartphones, tablets, laptops, etc.) and/or can be in communication with the user device 120 via a port or the like (e.g., such as those described above). The camera can be any suitable device such as, for example, a webcam, a forward or rearward facing camera included in a smartphone, tablet, laptop, wearable electronic device, etc. and/or any other suitable camera. In some implementations, the camera can include and/or can function in conjunction with one or more microphones (input devices) of the user device 120. In this manner, the camera (and microphone(s)) can capture media data of a given field of view. In some implementations, the output device (e.g., a display) can be configured to graphically represent the media data of the field of view captured by the camera (and microphone(s)).

The host device 130 can be any suitable compute device configured, among other things, to send data to and/or receive data from the database 140, the user devices 120, and/or the third party systems 110 via the network 105. In some implementations, the host device 130 can function as, for example, a PC, a workstation, a server device (e.g., a web server device), a network management device, an administrator device, and/or so forth. In some embodiments, the host device 130 can be a group of servers or devices housed together in or on the same blade, rack, and/or facility or distributed in or on multiple blades, racks, and/or facilities.

In some implementations, the host device 130 can be a physical machine (e.g., a server or group of servers) that includes and/or provides a virtual machine, virtual private server, and/or the like that is executed and/or run as an instance or guest on the physical machine, server, or group of servers (e.g., the host device). In some implementations, at least a portion of the functions of the system 100 and/or host device 130 described herein can be stored, run, executed, and/or otherwise deployed in a virtual machine, virtual private server, and/or cloud-computing environment. Such a virtual machine, virtual private server, and/or cloud-based implementation can be similar in at least form and/or function to a physical machine. Thus, the host device 130 can be one or more physical machine(s) with hardware configured to (i) execute one or more processes associated with the host device 130 or (ii) execute and/or provide a virtual machine that in turn executes the one or more processes associated with the host device 130. Similarly stated, the host device 130 may be a physical machine configured to perform any of the processes, functions, and/or methods described herein whether executed directly by the physical machine or executed by a virtual machine implemented on the physical host device 130.

Figure 2:
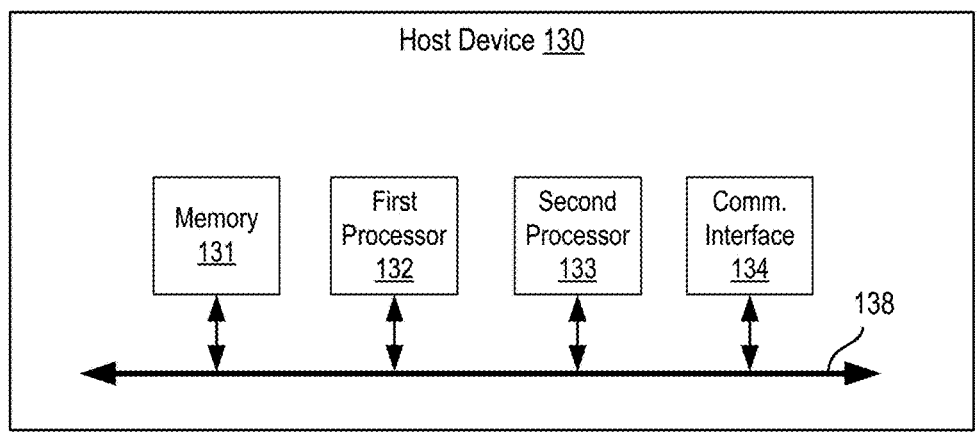
FIG. 2 is a schematic illustration of a host device included in the system of FIG. 1.

As shown in FIG. 2, the host device 130 includes at least a memory 131, a first processor 132, a second processor 133, and a communication interface 134. In some instances, the memory 131, the first processor 132, the second processor 133, and the communication interface 134 are in communication, connected, and/or otherwise electrically coupled to each other such as to allow signals to be sent therebetween via a system bus 138 and/or the like (e.g., including electrical traces, electrical interconnects, and/or the like). The host device 130 can also include and/or can otherwise be operably coupled to the database(s) 140 (shown in FIG. 1) configured to store user data, metadata, financial data, simulation data, notification data, third party system data, and/or the like.

The communication interface 134 can be any suitable hardware-based and/or software-based device(s) (e.g., executed by the first processor 132 and/or the second processor 133) that can place the host device 130 in communication with the database(s) 140, the user device(s) 120, and/or the third party systems 110 via the network 105. In some implementations, the communication interface 134 can further be configured to communicate via the network 105 and/or any other network with any other suitable device and/or service configured to gather and/or at least temporarily store data such as user data, metadata, financial data, simulation data, notification data, third party system data, and/or the like. In some implementations, the communication interface 134 can include one or more wired and/or wireless interfaces, such as, for example, network interface cards (NIC), Ethernet interfaces, optical carrier (OC) interfaces, asynchronous transfer mode (ATM) interfaces, and/or wireless interfaces (e.g., a WiFi® radio, a Bluetooth® radio, a NFC radio, and/or the like). As such, the communication interface 134 can be configured to send signals between the memory 131, the first processor 132, and/or the second processor 133, and the network 105, as described in further detail herein.

The memory 131 of the host device 130 can be, for example, a RAM, a ROM, an EPROM, an EEPROM, a memory buffer, a hard drive, a flash memory and/or any other solid state non-volatile computer storage medium, and/or the like. In some instances, the memory 131 includes a set of instructions or code (e.g., executed by the first processor 132 and/or the second processor 132) used to perform one or more actions associated with, among other things, communicating with the network 105 and/or one or more actions associated with receiving, sending, processing, analyzing, modifying, aggregating, calculating, simulating, and/or presenting loan data, loan payment data, user data, third party data, and/or the like (e.g., received from the third party systems 110 and/or one or more user devices 120, or stored in the one or more databases 140), as described in further detail herein.

The first processor 132 of the host device 130 can be any suitable processor such as, for example, a GPP, a CPU, an APU, a GPU, a network processor, a front end processor, an FPGA, an ASIC, and/or the like. The first processor 132 is configured to perform and/or execute a set of instructions, modules, and/or code stored in the memory 131. For example, the first processor 132 can be configured to execute a set of instructions and/or modules associated with, among other things, communicating with the network 105; communicating with the second processor 133 to selectively share data therebetween; receiving, sending, processing, analyzing, modifying, aggregating, etc. data; registering, defining, storing, and/or sending user data, financial data, and/or any other suitable data; and/or the like, as described in further detail herein.

The second processor 133 of the host device 130 can be any suitable processor such as, for example, a GPP, a CPU, an APU, a GPU, a network processor, a front end processor, an FPGA, an ASIC, and/or the like. In embodiments described herein, the second processor 133 can be a different type of processor the first processor 132 type. As described in further detail herein, such a configuration can be selected based of different tasks and/or different data structures intended to be performed, executed, and/or processed by the processors 132 and 133. The second processor 133 is configured to perform and/or execute a set of instructions, modules, and/or code stored in the memory 131. For example, the second processor 133 can be configured to execute a set of instructions and/or modules associated with, among other things, communicating with the network 105; communicating with the first processor 132 to selectively share data therebetween; receiving, sending, processing, analyzing, modifying, aggregating, calculating, simulating, registering, defining, storing, and/or sending data such as financial data and/or any other suitable data; and/or the like, as described in further detail herein.

In some implementations, the first processor 132 is configured to receive data from the user device that can include, for example, a mix of user data (e.g., metadata), financial data, and/or any other suitable data. In some instances, it may be desirable to separate, segregate, segment, classify, and/or otherwise identify the data based at least in part on the data type or contents or processes in which the data is to be used. For example, a user of the user device 120 can send data to the host device 130 that can include financial data associated with the user and data or metadata that includes personal identifying information (PII) associated with the user. In some implementations, it may be desirable to separate the data received from the user device and/or to otherwise define a first data set that includes the user-related metadata and a second data set that includes the financial data associated with the user. In this context, user data/metadata (e.g., including PII) is defined as information that may identify the user directly, such as name, email, phone number, etc., or identify loan information directly tied to a specific user account, such as loan ID, lender information, etc. and financial/loan data is defined as data used to for and/or otherwise detailing financial records, payments, calculations, simulations, forecasts, projections, etc. As such, the second data set can be, for example, anonymized financial data. Moreover, in some implementations, one or more probabilistic filters, algorithms, processes, methods, and/or the like (e.g., including but not limited to Bloom filters and/or the like) can be applied to the second data set to ensure that the second data set is devoid and/or sanitized of user metadata and/or data structures associated with the metadata.

Figure 3:
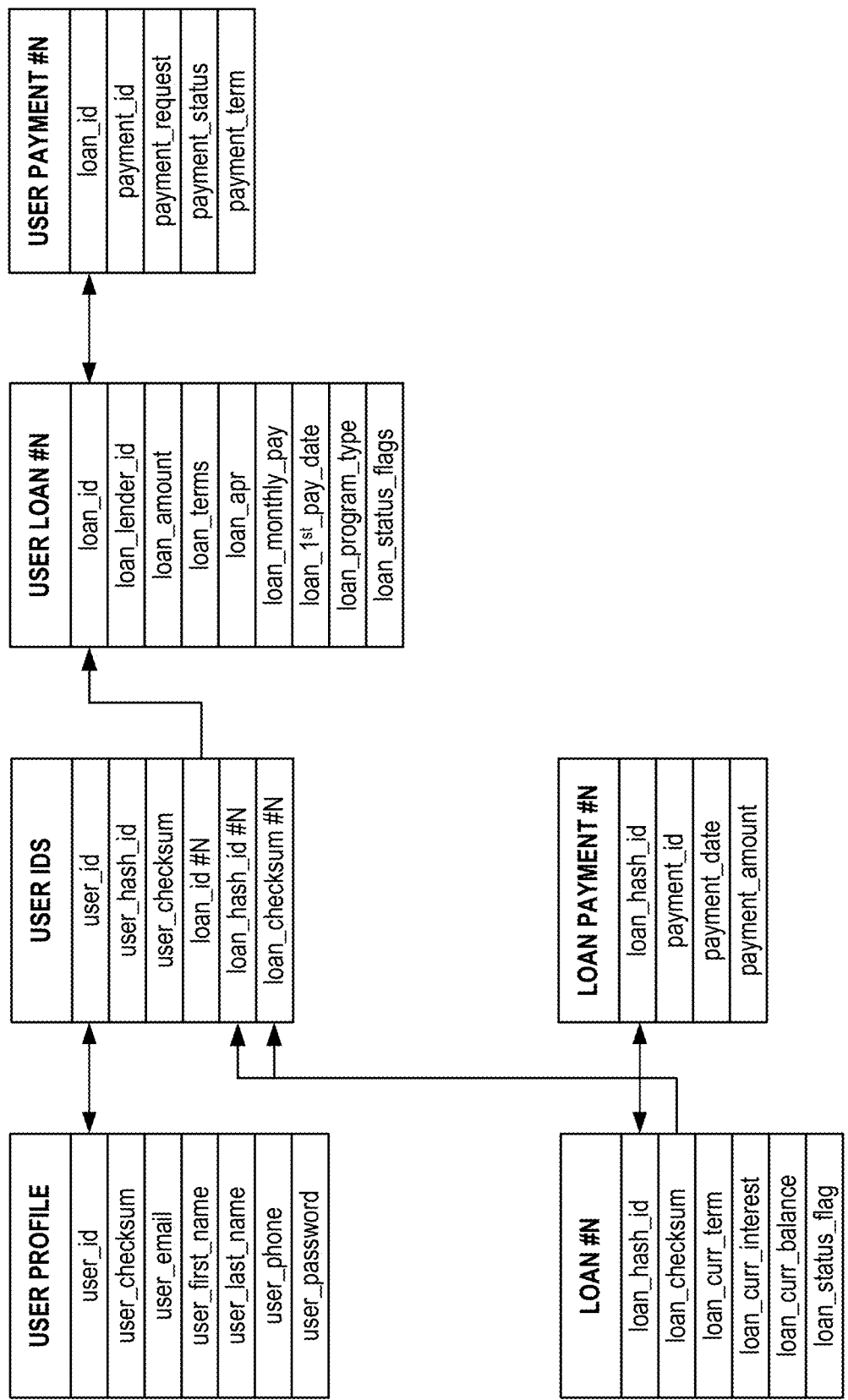
FIG. 3 is a schematic illustration of data structures associated with storing at least sensitive data in one or more databases included in the system of FIG. 1.

For example, as shown in FIG. 3, a checksum can be generated for the data (or portions of the data) in each of the first data set and the second data set. As an extension of a standard data checksum, which traditionally is a hash of the data set as a whole, in this implementation, the checksums can include a collection of hashes for each data set attribute (e.g., name, email, phone number, loan ID, etc.) or each combination of attributes (e.g., name and email, loan ID and lender, etc.). As such, the total number of elements (E) of the checksum of a data set (S) that has (n) attributes can be calculated as the carnality of the data set's power set, as expressed below:

$$E=|P(S)|=2^n$$

In some implementations, storing these individual checksum elements as hashes, can allow, for example, the use of probabilistic methods to check each anonymized data set (e.g., the second data set) for matches of non-privacy compliant data through duplication and/or collision checks. In some implementations, a Bloom filter, HyperLogLog, and/or the like can be used to accurately perform such checks.

In some instances, separating the data into the first data set and the second data set can, for example, protect the sensitive and/or PII data of the user such that the user associated with the anonymized financial data is unknown to other devices, thereby preventing and/or limiting identity theft and/or the like. For example, the system 100 can be configured to allow for the two data structures to exist independently (e.g., either on the same host device, server, or instance, or on separate host devices or servers in remote locations with different privacy standards). Similarly stated, the system 100 can allow for increased data privacy and security by decoupling a user's PII from financial/loan data, thereby allowing methods of computation, simulation, and storage to be performed on the anonymized data. Once removed of relevant PII, financial/loan data can be stored, computed, and/or cached in deduplicated chunks of data without concern for privacy.

In addition, it may be desirable to separate, segregate, segment, classify, and/or otherwise identify the data based on the data type or contents of the data to increase an efficiency associated with the operation of the host device 130. More specifically, any of the host devices 130, systems, embodiments, etc. described herein can be configured such that the first processor 132 is a CPU and the second processor 133 is a GPU or one or more similarly built ASICs, FPGAs, and/or the like. In general, CPUs often have an architecture and/or instruction set that makes them suitable for performing actions and/or processes on a wide-range of data allowing them to quickly perform tasks and/or the like (e.g., measured in CPU clock cycles) but are limited in the number of parallel processes that can be performed. In contrast, GPUs often have an architecture and instruction set that makes them suitable for performing actions and/or processes on specific data and/or data having a specific type or content (e.g., a narrower range of data than a CPU) with a substantially increased ability to perform parallel processes relative to CPUs. For example, a CPU may have one, two, four, eight, twelve, sixteen, or more processing cores or engines while a GPU may have hundreds or thousands of processing cores or engines.

In the implementations described herein, the financial/loan data is used for the real-time simulation of repayment schedules, acceleration program and/or methods, etc. Given the highly structured and compressed nature of the financial/loan data and corresponding simulation model(s), methods of computation, modeling, simulation, machine learning, iterative and/or estimation/verification processes and/or calculations, etc., are able to leverage GPU parallelization and/or other advantages/characteristics of the GPU. In addition, because of the particular architecture and/or characteristics of the GPU, using the GPU to classify and separate, segment, and/or segregate data as well as using the GPU to process metadata may be less efficient than performing such tasks on a CPU (e.g., the first processor 132). Accordingly, the system 100 can be configured to separate, segment, and/or segregate the data received from a user device 120 to, for example, utilize the processing power of the second processor 133 (e.g., GPU). For example, the first processor 132 (e.g., CPU) can receive the data from the user device and can evaluate, classify, identify, and separate the data into, for example, a first data set including the user data and/or metadata, and a second data set including anonymized financial/loan data. After defining the first data set and the second data set, the first processor 132 can send the second data set to the second processor 133, which in turn can perform any suitable processing, analyzing, calculating, simulating, modeling, machine learning, and/or the like. Performing segregated tasks as described herein can, among other things, increase an efficiency associated with the use of the host device 130 and/or any other portions of the system 100.

In some instances, the first data set can be stored as a first data structure in the memory 131 and/or at least one of the database(s) 140 and the second data set (and data associated with the processing performed by the second processor 133) can be stored as a second data structure in the memory 131 and/or at least one of the database(s) 140. In some implementations, the host device 130 can be a single server or the like that includes (e.g., physically includes) the memory 131 and both the first and second processors 132 and 133. In other implementations, the host device 130 can be a distributed server or can be one or more instances of a virtual server, etc., with a first server or instance including the first processor 132, a first portion of the memory 131, and a first database 140, and a second server or instance including the second processor, a second portion of the memory 131, and a second database 140. As such, the first data set (e.g., the user data/metadata) can be processed and stored on the first server or instance and the second data set can be processed and stored on the second server or instance.

In some implementations, the system 100 can be configured to link the first data set (user data/metadata) and the second data set (financial/loan data) allowing the system 100 to correlate the results of calculations, simulations, modeling, machine learning, etc. performed on the second data set to the user information associated with and/or represented by the first data set. For example, the system 100 can assign a one-way hash identification (ID) to each of the first data set and the second data set. In this example, one of these hash IDs can relate the user's primary account ID or other identifying data to a corresponding loan ID or other identifying data, while the other hash ID can relate and/or perform a checksum of both data sets to ensure data integrity and prevent tampering. In some implementations, the system 100 can perform the assignment and correlation of the hash IDs and the checksum tasks. In other implementations, a trusted third party can be delegated (e.g., via a system API or the like) to perform the assignment and correlation of the hash IDs and the checksum tasks.

As described above, the second processor 133 can be configured to receive the second data set from the first processor 132. Upon receipt, the second processor 133 can perform any suitable analysis, calculation, simulation, machine learning, and/or the like using the second data set. For example, in some instances, the second processor 133 can analyze the second data set (e.g., loan data) and based on the analysis can define any desirable loan information not included in the second data set. In some instances, the second processor 133 can utilize one or more formulas, algorithms, methods, and/or the like to define the missing loan data such as any of those described in further detail herein. In addition, the second processor 133 can be configured to perform one or more simulations associated with and/or otherwise simulating an acceleration of a loan repayment schedule. For example, in some instances, a user can select from a set of predefined simulations that can simulate, predict, and/or forecast an effect of applying one or more payments to be applied against a loan principal that are in addition to and/or in excess of the loan repayments according to the amortization schedule of the loan. In addition to the simulations, the second processor 133 can also be configured to perform one or more machine learning models, artificial intelligence processes, and/or any other data analytics on the second data set (or on a data set that includes the second data set from a number of user devices 120).

As described in further detail herein with reference to specific examples, the system 100 and/or host device 130 can provide a user with such simulated accelerated repayment profiles or programs, allowing the user to make informed decisions on how to save money, time, and/or combinations thereof over the term of the user's loan. Moreover, the system 100 and/or host device 130 can provide the user with a platform for executing such simulated accelerated repayment profiles or programs. For example, the system 100 and/or host device 130 can provide the user with a platform for making regularly scheduled loan payments as well as payments in addition to the regularly scheduled loan payments. The system 100 and/or host device 130, in turn, can make such payments to a lender (e.g., a third party system 110) on behalf of a user (borrower) at a predetermined and/or desired time that minimizes an amount of interest calculated on the loan balance for the following scheduled period (e.g., for the next month). For example, the system 100 and/or the host device 130 can make such payments "a day early" and/or otherwise within a predetermined time prior to the interest calculation on the loan balance for the following scheduled period, as described in further detail herein.

The database(s) 140 can be any suitable database(s) such as, for example, a relational database, an object database, an object-relational database, a hierarchical database, a network database, an entity-relationship database, a structured query language (SQL) database, a "not only" SQL (NOSQL) database, an extensible markup language (XML) database, a digital repository, a library, a cloud server or storage, and/or the like. In some implementations, the database(s) 140 can be one or more searchable databases and/or repositories. In some implementations, the database 140 can be and/or can include a relational database, in which data can be stored, for example, in tables, matrices, vectors, etc. according to the relational model.

In some implementations, the host device 130 can be in communication with the database 140 over any suitable network (e.g., the network 105) via the communication interface 134. In such implementations, the database(s) 140 can be included in or stored by a network attached storage (NAS) device that can communicate with the host device 130 over the network 105 and/or any other network(s). In some implementations, the database(s) 140 can be stored in the memory 131 of the host device 130 and/or can be operably coupled to the host device 130 via a cable, a bus, a server rack, and/or the like.

The host device 130 can include and/or can be in communication with or operably coupled to a single database 140 or multiple databases 140. In some implementations, a single database 140 can include, for example, any number of partitions, structures, and/or portions allowing the database 140 to separate, segregate, and/or segment the user data (e.g., the first data set) from the financial/loan data (e.g., the second data set). In some implementations, multiple databases 140 can be distributed between any number of server devices and/or virtual instances of server devices. For example, the host device 130 can be operably coupled to and/or otherwise in communication with a first database configured to receive and at least temporarily store user data, user profiles, and/or the like and a second database configured to receive and at least temporarily store financial data, loan data, schedule data, simulation data, modeling data, machine learning data (e.g., data resulting from machine learning), and/or the like. In some embodiments, the host device 130 can be operably coupled to and/or otherwise in communication with a database that is stored in or on the user device 120 and/or the third party systems 110. Similarly stated, at least a portion of a database can be implemented in and/or stored by the user device(s) 120 and/or the third party systems 110. In this manner, the host device 130 and, in some instances, the database 140 can be in communication with any number of databases that can be physically disposed in a different location than the host device 130, while being in communication with the host device 130 (e.g., via the network 105), as described above.

As described above, the system 100 (e.g., the host device 130 and/or the database(s) 140) can be configured to store data in any suitable format, structure, etc. or combinations thereof. In some instances, the database(s) 140 can store data associated with users who have registered with the system 100 (e.g., "registered users"). In some such instances, a registration process can include a user providing the system 100 (e.g., the host device 130) with personally identifying information, user preferences, user settings, signed releases, consent and/or agreement of terms, financial and/or loan data, and/or any other suitable data. In response, a user profile data structure can be defined in the database(s) 140 and at least a portion of the data can be stored in and/or associated with that user profile data structure.

FIG. 3 illustrates an example of various data structures that can be used, generated, and/or stored in or by the system 100 and/or host device 130. As described above, in some implementations, the first processor 132 can be configured to segment data received from the user device(s) 120 into a first data set including user data/metadata and a second data set including financial/loan data, etc. In some implementations, the data sets can have and/or can be stored in different data structures and in the same database 140 or different databases 140. In some instances, the first data set can include, for example, a user profile data structure for each user of the system 100, a user ID data structure, a loan data structure, a loan payment data structure, a user loan data structure, a user payment data structure, and/or any other suitable data structure. In this example, the user profile data structure can include but is not limited to, for example, a user ID, a user checksum, a user email, a user first and last name, a user phone number, a user password, and/or the like. The user ID data structure can include but is not limited to, for example, the user ID, a user hash ID, the user checksum, a loan ID, a loan hash ID, a loan checksum, and/or the like. The loan data structure can include but is not limited to, for example, the loan hash ID, the loan checksum, a loan current term, a loan current interest rate, a loan current balance, a loan status flag, and/or the like. The loan payment data structure can include but is not limited to, for example, the loan hash ID, a payment ID, a payment date, a payment amount, and/or the like. The user loan data structure can include but is not limited to the loan ID, a loan lender ID, a loan amount, loan terms, a loan APR, a loan monthly payment, a loan first payment date, a loan program type, the loan status flag, the loan status flag, and/or the like. The user payment data structure can include but is not limited to the loan ID, the payment ID, a payment request, a payment status, and a payment term.

As shown in FIG. 3, each data structure can be defined and/or stored independent of the other data structures. As described above, the system 100 and/or the host device 130 can be configured to use the various hash IDs and checksums to uniquely identify the data structures, which can allow the data to be separated and/or segmented, at least a portion of the data (e.g., anonymized loan data) to be analyzed, computed, simulated, and/or otherwise processed, and then the separated and/or segmented data to be linked and/or correlated after the analysis, etc.

Figure 4:
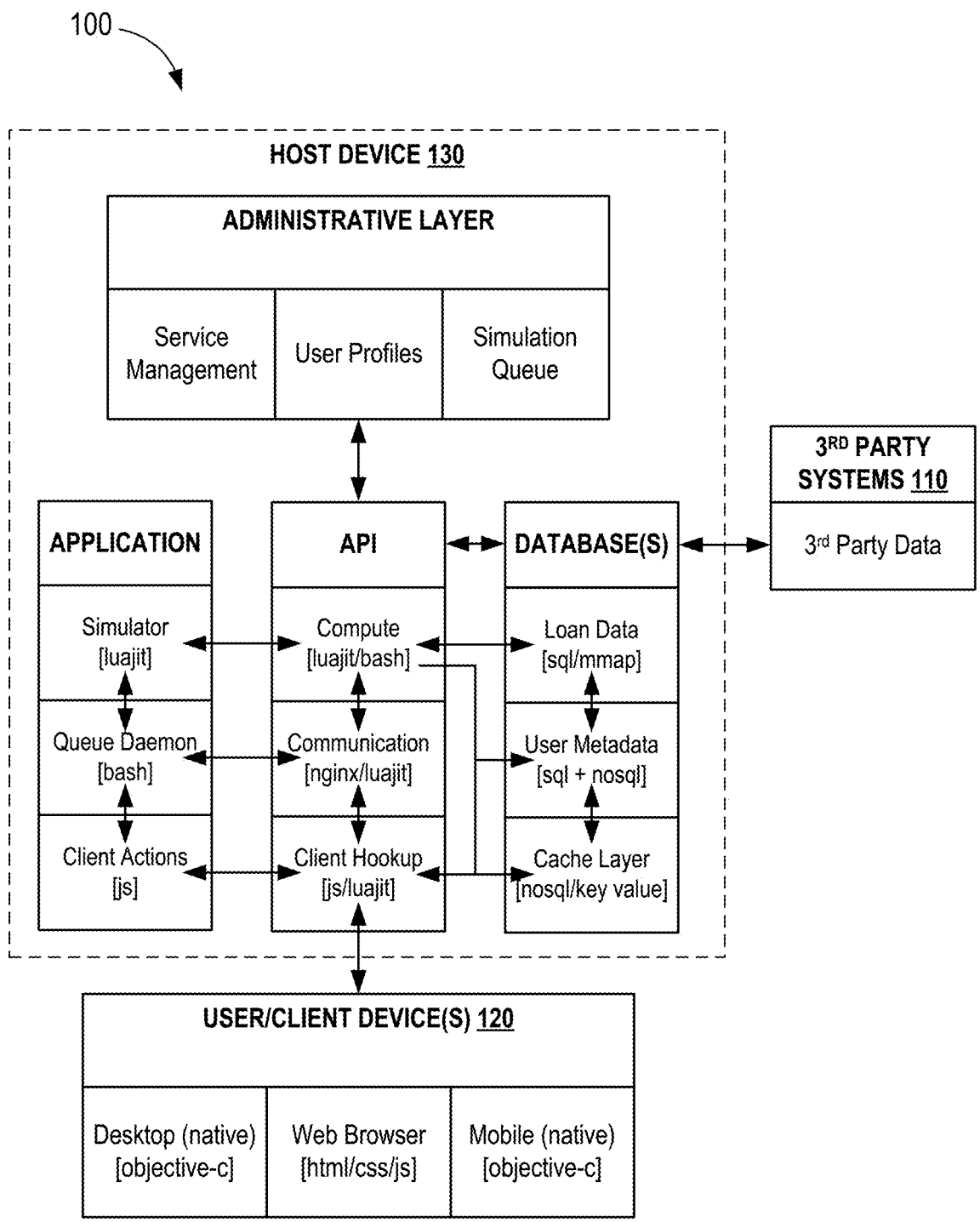
FIG. 4 is a schematic illustration of at least a portion of the system of FIG. 1 and illustrating certain details of the host device.

An example implementation of the system 100 is shown in FIG. 4. As shown, the host device 130 can be implemented with, for example, an administrative layer that can include, for example, any suitable service management system, user profile management system, simulation queue, and/or the like. In some implementations, the administrative layer can administer, manage, control, direct, etc. data flow through the host device 130 and/or system 100. The host device 130 further provides, includes, and/or is operably coupled to database(s) (e.g., the database(s) 140 shown in FIG. 1), an application programming interface (API), and at least one application.

As shown, the database(s) can store, for example, loan data, user metadata, and/or any other suitable data. The database(s) can further include a cache layer or the like. In some implementations, the database(s) (or a portion of a single database) can provide an SQL and/or memory-mapped input/out structure for storing loan data, an SQL and NOSQL structure for storing user data/metadata, and a NOSQL/Key Value structure for storing and/or providing the cache layer. As shown, the database(s) are in communication with the third party systems 110 (and/or at least portions thereof) and are further configured to send and receive data therebetween. In some implementations, the database(s) can provide a structure or the like configured to store the third party data.

The API can provide an interface for interacting with the host device 130 and/or portions of the system 100. Specifically, the API can be configured to provide compute operations (e.g., using luajit, BASH, and/or the like), communication operations (e.g., using NGINX, luajit, and/or the like), client (user) hookup operations (e.g., using JavaScript (js), luajit, and/or the like), and/or any other suitable operations. Moreover, the API can send and/or receive data between the administrative layer, the database(s), and the application(s) of the host device 130 and can provide an interface for send and/or receive data between the host device 130 and the user/client device(s) 120.

The application(s) of the host device 130 can be configured to run and/or execute and/or suitable programs, functions, executables, etc. associated with the host device 130. For example, the application(s) can include a simulator (e.g., executed using luajit and/or the like) for performing simulations on loan data, a queue daemon (e.g., executed using BASH) for queueing data for the simulator, and a client actions platform or interface (e.g., executed using JavaScript) for receiving instructions, requests, and/or data from the user/client device(s) 120.

As shown, the user/client device(s) 120 are in communication with the host device 130 (e.g., via the network 105, as shown in FIG. 1) and configured to send and/or receive data therebetween. More specifically, the user/client device(s) 120 can provide at least one of a native desktop application (e.g., executed using objective-c and/or the like), a native mobile application (e.g., executed using objective-c and/or the like), and/or a web browser (e.g., executed using hypertext markup language (html), cascading style sheets (CSS), and/or JavaScript (js). As such, a user of the user/client device(s) 120 can execute the user/client device applications to generate data that is provided, for example, to the host device 130 via the API and/or to receive data from the host device 130 via the API.

Figure 5:
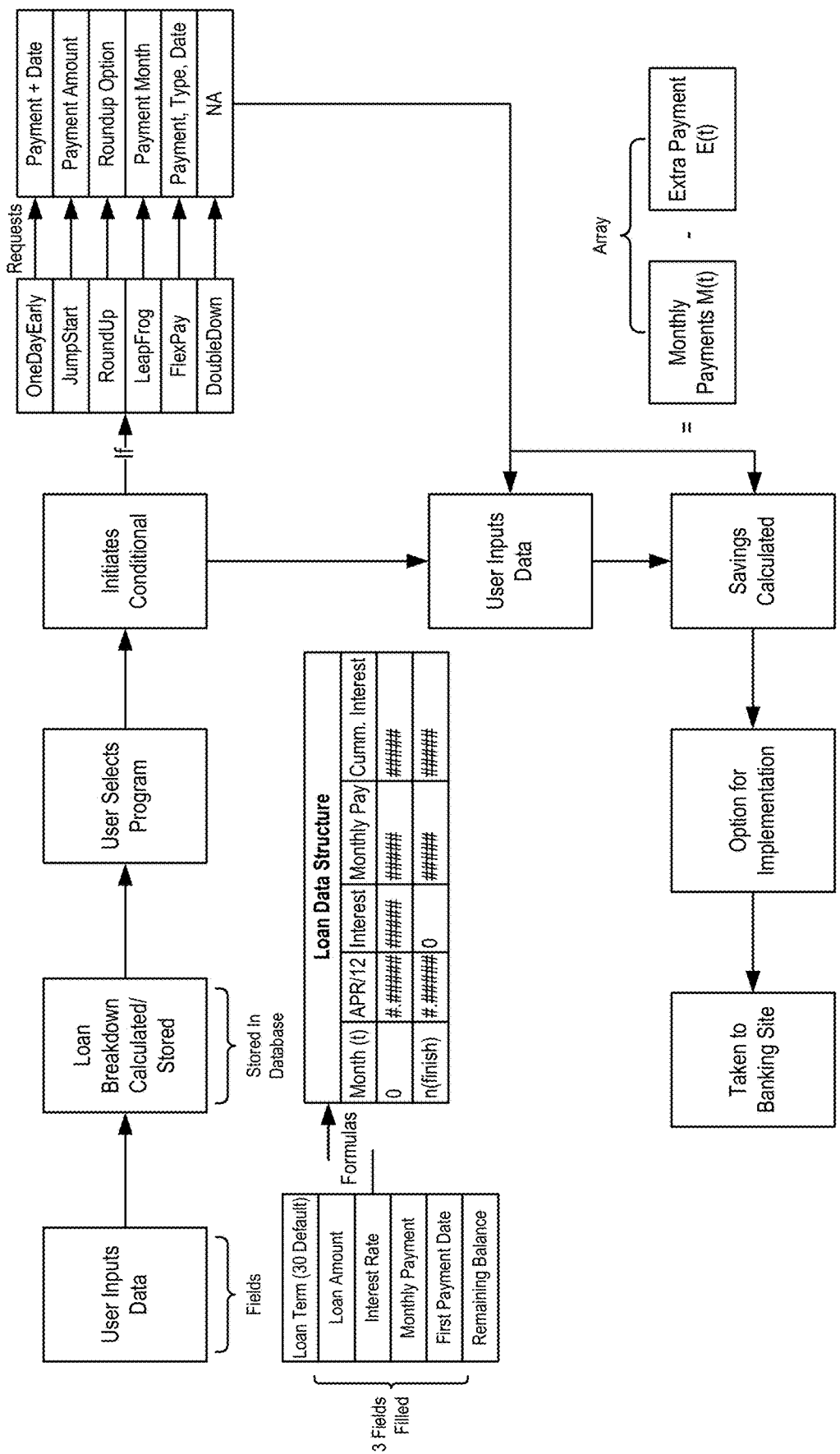
FIG. 5 is a schematic illustration showing a use of the system of FIG. 1, according to an implementation thereof.

An implementation of the system 100 in use is shown, for example, in FIG. 5. In this example, a user can engage and/or manipulate a user device (e.g., any of the user device(s) 120 shown in FIG. 1) to interact with and/or use the system 100. In some instances, the user can be, for example, a registered user having a user profile data structure stored in the database(s) 140. In other instances, the user can manipulate the user device 120 to register with the system 100 such that the host device 130 defines and/or generates a user profile data structure. In still other instances, the user can manipulate the user device 120 to interact with the system 100 without registering (e.g., interacting as a "guest" account).

As shown, the user, via the user device 120, can provide user input data. As described above with reference to FIG. 4, the user can manipulate the user device 120 such that one or more actions associated with the system 100 is/are executed via a native desktop application, a native mobile application, and/or a web browser. As such, the user device 120 can send data to the host device 130 via the network 105 and the host device 130 can receive the data via the communication interface 134 and, for example, the API provided by the host device 130.

As described in detail above, the host device 130 can be configured such that the user data is sent to the first processor 132, which in turn, analyzes and/or evaluates the user data and then separates, segments, and/or segregates the data into at least a first data set and a second data set. The first data set can be and/or can include, for example, user-related data/metadata (referred to herein for simplicity as "metadata") that includes and/or represents sensitive information, PII, and/or other user-specific data. The second data set can be and/or can include, for example, anonymized loan data and/or the like that is devoid of the metadata.

In some instances, the loan data can include data describing aspects and/or details of a loan provided by a lender (e.g., having a third party system 110 in communication with the host device 130 via the network 105) to the user (borrower). For example, the loan data can include at least three of the following loan details:

loan term
original loan amount
interest rate
monthly payment amount
first payment date
remaining balance/current loan amount.

In some instances, it may be desirable to determine all six of the parameters and/or details described by the loan data despite the user providing only a subset of the information. In such instances, the host device 130 (e.g., the first processor 132 or the second processor 133) can evaluate the loan data to determine which of loan parameters are included in the loan data and can perform and/or execute one or more reverse amortization formulas and/or methods to define the missing loan details. The reverse amortization formulas and/or methods are described in detail below with reference to example implementations and are based at least in part on the amortization formula and/or method expressed below:

$$A = P \cdot \frac{r \cdot (1+r)^N}{(1+r)^N - 1}$$

In this manner, the host device 130 can calculate any missing loan data (e.g., that was not provided by the user). In some instances, the host device 130 can be configured to organize and/or arrange the loan data into a desirable data structure as represented, for example, by the table shown in FIG. 5. In some instances, the loan parameters and/or details can be calculated and/or determined by the first processor 132 (e.g., a CPU). In such instances, the first processor 132 can be configured to store the loan parameters organized into the loan data structure in the database(s) 140 and separate from the corresponding metadata. As described above, the first processor 132 and/or any other suitable portion of the host device 130 can define and/or assign unique hash IDs for the metadata and the loan data allowing the data to the separately stored and correlated in one or more subsequent processes and/or actions. In addition to or instead of storing the loan data structure, in some instances, the first processor 132 can be configured to send the loan data structure to the second processor 133 (e.g., a GPU) for further processing.

For example, as shown in FIG. 5, the user can select a loan repayment simulation from a set of predefined simulations and the host device 130 can initiate the simulation and request user inputs for additional information. More particularly, in this example, the host device 130 can be configured to perform one or more of six different payment simulations, namely:

OneDayEarly
JumpStart
RoundUp
LeapFrog
FlexPay
DoubleDown.

In some implementations, the "OneDayEarly" simulation simulates and/or allows consumers/users to see the exponential effect/benefit over the life of the loan, of one extra principal payment (e.g., made "a day early" relative to the start of the next payment/billing cycle or just prior to the calculation of the next month's interest). In some implementations, the user, via the user device 120, can be prompted to provide additional information such as, for example, a payment amount and a date (e.g., month and year) to make the payment.

In some implementations, the "JumpStart" simulation simulates and/or allows consumers/users taking out a new installment and/or amortized loan (e.g., a new mortgage for the purchase of a house, and/or the like) to see the effect/benefit of making an extra principal payment at the end of the origination month, prior to even the first month's amortization (interest) calculation (e.g., made "a day early" or just prior to the amortization calculation). In some implementations, the user, via the user device 120, can be prompted to provide additional information such as, for example, a payment amount.

In some implementations, the "RoundUp" simulation simulates and/or allows consumers/users to see the effect/benefit of rounding up their regularly scheduled payment to the nearest $10, $50, $100, $1000 (or any suitable amount or an amount therebetween) (e.g., made "a day early" or just prior to the amortization calculation). In some implementations, the "RoundUp" simulation can be based off of a percentage of a payment as the basis for the rounding (e.g., 1%, 5%, 10%, 25%, 50%, 75%, 100%, 200% (or more) and/or any percentage or fraction of a percentage therebetween) In some implementations, the user, via the user device 120, can be prompted to provide additional information such as, for example, a rounding increment (e.g., nearest $10, nearest $100, nearest $1,000, 10% of the regularly scheduled payment, 50% percent of the regularly scheduled payment, 200% of the regularly scheduled payment, etc.).

In some implementations, the "LeapFrog" simulation simulates and/or allows consumers/users to choose any principal portion of any future payment on their amortization schedule and see the effect/benefit of making that payment (e.g., made "a day early," or just prior to the calculation of the next month's interest). In some implementations, the user, via the user device 120, can be prompted to provide additional information such as, for example, a month or payment period during which to make the payment.

In some implementations, the "FlexPay" simulation simulates and/or allows consumers/users to see the effect/benefit of scheduling recurring payments (e.g., monthly, quarterly, semiannually, annually, or according to custom scheduling, editable anytime) (e.g., made "a day early" or just prior to the amortization calculation). In some implementations, the user, via the user device 120, can be prompted to provide additional information such as, for example, a payment amount, a payment schedule (e.g., quarterly, semiannually, annually, etc.), and a date (e.g., month and year) to begin the schedule.

In some implementations, the "DoubleDown" simulation simulates and/or allows consumers/users to see the effect/benefit of automatically paying the next month's scheduled principal in addition to the current principal in the regularly scheduled payment. The double down extra principal amount is automatically paid "a day early" or just before that month's regularly scheduled payment. Moreover, the double down simulation is not dependent on further user input.

With the amount of extra payment, the payment date, and the payment period defined, the second processor 133 can be configured to perform the simulation according to the user selection. As shown, the simulation performed by the second processor 133 can calculate and/or simulate an amount of savings as a result of making such extra payments according to the user input and assuming the payments are made "a day early," at most 24 hours prior to, and/or just before the calculation of the interest for the next payment period (e.g., a month). In other words, the second processor 133 can simulate an acceleration of the predetermined loan repayment schedule as a result of the at least one additional payment.

After executing the selected simulation, the host device 130 can be configured to correlate the simulation data to the corresponding user profile data structure (e.g., using the unique hash IDs, checksums, and/or the like). In some implementations, the first processor 132 can receive the simulation and/or otherwise processed loan data from the second processor 133 and can perform one or more actions to correlate the simulation/processed loan data to the user profile data structure. Once correlated, the host device 130 can send the simulation data to the user device 120 (e.g., sent via the communication interface 134 and the network 105). The user device 120, in turn, can present the simulation data on a user interface of the user device 120.

In some instances, the user device 120 can further present an option to the user to implement the simulated acceleration scenario. In some implementations, if the user chooses to implement the simulated acceleration scenario, the host device 130 can direct the user (e.g., via the user interface of the user device 120) to, for example, the third party system 110 associated with the lender for the user's loan. In some implementations, the host device 130 can direct the user to a payment interface of the system 100 allowing the user to make a payment (e.g., including a regularly scheduled loan payment and any additional payment according to the performed simulation). In this manner, the system 100 and/or the host device 130 can be configured to direct the payment to, for example, the corresponding third party system 110 on behalf of the user and at or on a predetermined date/time such as, for example, "a day early" and/or at most 24 hours or otherwise just before the calculation of the interest for the next payment period (e.g., a month). As such, the user can realize and/or receive the actual savings in money and/or time that was simulated. In some implementations, the host device 130 can be configured to automatically implement the simulation according to instructions received from the user device 120, which can include, for example, receiving money from an account associated with a user (e.g., a third party system 110 such as a banking system, etc.), making payment(s) to a third party on behalf of the user (e.g., via a third party system 110), and/or any other automated, automatic, and/or prearranged tasks.

While the second processor 133 is described above as performing simulations and/or otherwise modeling an acceleration of a predetermined loan repayment schedule as a result of making at least one additional payment that is applied to the principal just before the calculation of the next month's interest calculation (and/or otherwise "a day early"), the second processor 133 can further be configured to perform any other calculations and/or processes on the anonymized loan data. For example, in some implementations, the second processor 133 can be configured to execute one or more machine learning models (e.g., neural networks, random forests, decision trees, etc.) to define additional data associated with the user and/or the user's loan, to provide recommendations for which acceleration option may be the best option for a given user, to make broad determinations, calculations, predictions, etc. based on an analysis of a large number of loan data parameters and/or scenarios, and/or to provide any other suitable analysis based on machine learning and/or artificial intelligence.

In the situation where user input and/or one or more of the acceleration options result in a number of potentially desirable results, previously simulated data can be structured and used to fine tune the results. For example, previously modeled data may have originated either from the user requesting the recommendation, or from other users with similar interests based on non-PII data (e.g., data set attributes that are not subject to PII nor the checksum operations associated with the first data set, thereby ensuring privacy and/or otherwise anonymizing the date). By using such data and/or data attributes, neural network models can be created and/or executed on a per data attribute, per user, and/or per group of users with common/overlapping interest(s) basis in a semi-supervised machine learning environment. In some implementations, these models can also be correlated to anonymized user satisfaction data to provide training feedback when a recommended result is not a desired result for the user that requested the recommendation. With the models being reliant and/or otherwise based on the anonymized data, recommendations based on values found in the second (loan) data set may be of interest to the user (e.g., recommendations on or associated with monthly payments, payment frequency, rate of payment, acceleration option methodology, etc.).

Figure 6:
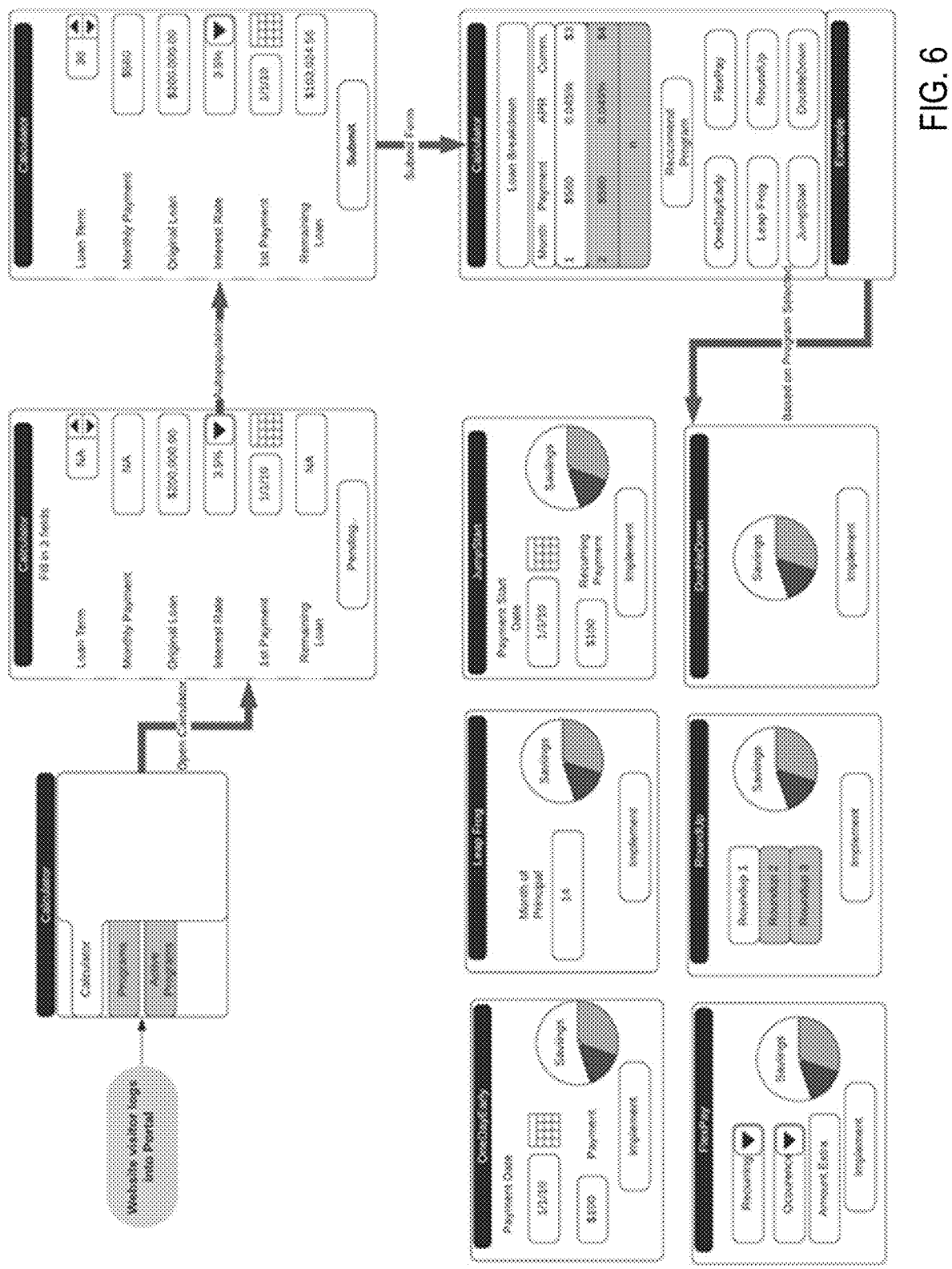
FIG. 6 are various screenshots of a user interface of a user device during use of the system of FIG. 1, according to an implementation thereof.

FIG. 6 is a series of screenshots illustrating an example of a user of a user device 120 interacting with the system 100. More particularly, the user device 120 can be configured to graphically represent data associated with and/or corresponding to the screenshots on a display and/or via a user interface of the user device 120. As such, the user can be presented with an interface for inputting user and/or loan data, selecting simulation options, and/or reviewing data and/or information resulting from the host device 130 performing the selected simulation(s).

Example 1

The systems, methods, and devices described herein each have several innovative aspects, no single one of which is solely responsible for the described desirable attributes. The embodiments and/or implementations described below are presented by way of example to illustrate certain concepts, features, aspects, etc. The following embodiments and/or implementations are not necessarily intended to identify key concepts or essential aspects of the disclosed subject matter, nor should they be considered exhaustive or otherwise used to constrict or limit the scope of the claims. For example, the scope of the claims should not be limited based on whether the recited subject matter includes any or all aspects noted in the following example embodiments and/or implementations. Other embodiments and/or implementations within the scope and spirit of disclosure are possible.

In some implementations, the systems and/or methods described herein (e.g., the system 100) change the common industry consumer practice of making one's mortgage payment as well as any extra principal payments towards the loan, on the 1st of the month, within the grace period set by the lender. The systems and/or methods can enable a consumer to pay extra principal desired to pay down their loan, accelerating its payoff (e.g., a day earlier than their regularly scheduled mortgage payment). By paying early (e.g., just prior to the moment interest is calculated for the following month), the systems and/or methods described herein can be utilized to save the following months interest on that extra principal amount paid. In some instances, for example, the system (e.g., the system 100 and/or the host device 130 thereof) can receive data associated with the billing cycle or the like associated with a loan, etc. (e.g., from a third party system and/or otherwise as data provided by a user) and can determine and/or calculate a desired time for making payments (e.g., just before the calculation of the interest for the next billing cycle). By making the extra principal payment early (e.g., just prior to the interest calculation), the consumer saves the following month's interest on that principal portion paid, which can exponentially decrease an amount repaid over the life of the loan.

In some instances, the methodology involves a consumer, user, etc. (e.g., a registered user) providing and/or paying to the system (e.g., the system 100 and/or the host device 130 thereof), a loan payment and any extra payment to be applied to principal and to save the following months interest on that amount. The system and/or method (e.g., the host device 130 of the system 100) can use reverse amortization formulas and/or methods derived to populate a set of fields (e.g., six fields of data) with minimal data from the user, which can increase customer/user retention/conversion percentages (e.g., percentages near or at 95%). The system can include and/or perform a simulator to generate efficient simulated results associated with making early payments. The communication between calculator populating missing information and simulator providing simulated results of, for example, six acceleration programs can be direct, real time, and unique. The displayed data results of time and money saved can be presented in comprehensive ways for the consumer.

The systems and/or methodology can be applied to mortgages as well as other types of consumer debt. In general, conventional lenders accept extra principal payments anytime; however, they apply the payment on the day of interest calculation for the following month (e.g., per the rules of amortization). For example, for a payment/billing cycle ending on the last day of a 30 day month) if an extra payment was sent in on the 1st of that month along with the regularly scheduled mortgage payment, it would be applied at the end of the month, making the payment 29 days earlier than what is efficient. The methodology executed by any of the systems described herein includes accepting and applying payment within 24 hours of monthly interest calculation or the start of the next billing cycle, making the system more efficient than those that apply the payment any time during the month.

In some implementations, the systems and/or methodology described herein can use one or more of six math formulas and/or methods reversing through the forward formula of amortization. The formulas and/or methods can, for example, work with automated acceleration programs designed to accelerate an amortized mortgage, which can be customizable to an individual application. Data is also created and/or derived and used in a simulator, calculator, and/or registered user's account snapshot. The systems and/or methodology (e.g., the host device 130 of the system 100) implements, for example, one or more of the six reverse amortization formulas, one or more of the six acceleration programs, a simulator allowing simulation and implementation, a calculator used to auto-populate with real time consumer loan information, thereby requiring less information from the consumer than some other known systems and/or methods. The systems and/or methods can allow direct implementation through any of the six programs, and can rely on application of the same six reverse amortization formulas and/or methods and an data drive understanding of the rules of amortization, all of which have designed for efficiency in time and money savings provided to the consumer. One added efficiency is having the extra principal payment made at the moment of interest calculation rather than the same day (or made at most one day earlier than the interest calculation). In some instances, this involves many different moments along with different time zones, national and international, with the possibility of missing the moment.

In some implementations, registered consumers enter at least partial loan information and the system (e.g., the calculator) is used to self-populate the remaining possibly unknown information. In some implementations, the system uses six pieces of data used to initiate the program, namely, loan term, original loan amount, interest rate, monthly payment amount, 1st payment date, and balance at time/current loan amount.

In some implementations, the consumer sees and/or is presented with a snapshot of their loan details (e.g., on a user interface of a user device such as those described above with reference to FIG. 1) and then has the option to simulate the effect of making extra principal payment(s). The consumer has the option to choose one or more of the six programs that best suits their goals, namely, OneDayEarly, RoundUp, JumpStart, LeapFrog, DoubleDown, and FlexPay.

Once chosen, the automated and efficient initiation of the payment is performed at the end of the month (e.g., a day early) when interest is calculated. Time and money savings result from such payment and are provided and/or shown consistently and in real time throughout the process from simulation to implementation (e.g., payment).

Example 2

In some implementations, the method and/or process can start with a consumer base such as, for example, homeowners with a mortgage and aspiring homeowners and future mortgagees. A consumer and/or user can, for example, utilize an application such as a desktop application, a mobile application, an Internet web browser, etc. to interact with the system (e.g., the system 100). The consumer/user can simulate mortgage potential savings, based on a loan amount, term in years, and/or a chosen interest rate. The simulator can give the resulting monthly payment. Users then have the option to simulate the effect of making an extra principal payment or a scheduled one time or recurring payment (e.g., monthly, quarterly, semiannually, and annually, or according custom scheduling).

A system or host device (e.g., the host device 130 of the system 100) can execute the simulator application(s), program(s), etc., which in turn, can use the methodology herein with the extra principal beginning, for example, a day early from the assumed beginning of the then simulated term. This is disclosed to the consumer as a simulated result equal to a "Jumpstart" program. This is one way the simulator is different than some known and/or conventional simulators used in the marketplace/industry. The systems and methods described herein calculate and/or simulate the early paying of extra principal (e.g., a day earlier than the regularly scheduled payment on the 1st) and can calculate and/or simulate the savings associated with the following month's interest on that amount. In some implementations, the calculated savings is carried through the simulator, calculator, and/or program processes and functions.

In some implementations, any of the methods described herein can allow consumers/users to register for free. The registration process can involve consumers/users creating an account with certain identifying information (e.g., an email (which can become a username), name, password, phone number for two-factor authentication, zip code, and/or the like). The system can ask if they have an existing loan to accelerate or if they are a future homeowner. In order to setup a profile/snapshot of the consumer's existing loan, one or more of the following pieces of data can be gathered: loan term, original loan amount, interest rate, monthly payment amount, 1st payment date, and balance at time/current loan amount.

This data can be used to provide time and money savings information to the consumer/user. In some implementations, a future homeowner can register and user the system to simulate until they obtain an actual mortgage.

In some instances, requiring a consumer to know and/or provide all six pieces of information (listed above) can cause a low conversion, registration, retention, and/or follow through of or by the user. For example, consumers/users may have to leave the registration process to find the data needed in order to complete. Once gone, the estimated fallout (e.g., consumers/users not returning the registration process) may be undesirable. Accordingly, the reverse amortization formulas and/or methods are used to self-populate the fields even though not all of the information is provided. For example, in some instances, three fields can be self-populated using data provided by the user for three other fields.

Expanding further, in some implementations, the amortization formula can be used (e.g., can be executed by or on a device such as the host device 130) to calculate periodic payments on a principal loan given a time period of the loan, interest rate, and number of payments per year. Usually the interest rate is given as an annual percentage rate (APR) and the number of payments per year is set to 12 (i.e., payments on a monthly basis). These standards, however, are not necessary—the formulas described herein can work out any detail of a loan in a general way.

In some instances, deriving the desired formulas, starts with a principal amount, P, and periodic payments, A, to the principal. Interest is considered as accruing on the balance at each period. The table below summarizes the variables used in the calculations.

| Variable | Description | |
|---|---|---|
| P | Principal amount of the loan | P = $20,000 |
| R | Annual percentage rate | R = 5% APR |
| T | Number of years the loan is taken out for | T = 15 (15 year loan) |
| n | Number of payments per year | n = 12 (monthly payments) |
| r | Periodic interest rate (R/n) | r = 0.05/12 |
| N | Total number of payments (n · T) | N = 12 × 15 = 180 |
| A | The amount paid each period | A = ? (to be calculated) |
| t | The number of periods that have passed. | t = 5 (the fifth payment), t = 0 is the original balance |

In general, the principal of the loan at time t=0 is the full amount of the loan and thus, $p_0$=P. Periodic payments are then made, while considering the amount of interest that has accrued. The remaining balance at a given time is the previous balance minus the current payment plus the accrued interest since the last payment, as expressed by the formula below:

$$P_t = P_t-1 - A + r \cdot P_t-1$$

Thus, starting from the beginning, the principal at a given time after period payments can be expressed as a series of formulas, as shown below:

$$P_0 = P$$
$$P_1 = P_0 - A + P_0 \cdot r \quad = P \cdot (1+r) - A$$
$$P_2 = P_1 \cdot (1+r) - A \quad = P \cdot (1+r)^2 - A \cdot (1+r) - A$$
$$P_3 = P_2 \cdot (1+r) - A \quad = P \cdot (1+r)^3 - A \cdot (1+r)^2 - A \cdot (1+r) - A$$
$$P_4 = P_3 \cdot (1+r) - A \quad = P \cdot (1+r)^4 - A \cdot (1+r)^3 - A \cdot (1+r)^2 - A \cdot (1+r) - A$$
$$\vdots$$
$$P_t = P_{t-1} \cdot (1+r) - A \quad = P \cdot (1+r)^t - A \cdot \sum_{k=0}^{t-1} (1+r)^k$$

Using the identity for the sum of a geometric series, we can substitute the sum with a formula, as expressed below:

$$\sum_{k=0}^{t-1} (1+r)^k = \frac{(1+r)^t - 1}{r}$$

and thus, the principal at a given time (t) after period payments can be expressed as:

$$P_t = P \cdot (1+r)^t - A \cdot \frac{(1+r)^t - 1}{r}$$

In addition, by the end of all the payments, the remaining amount of the loan should be zero ($P_N=0$), which can allow the formula for the payment amount each period, A, as shown below:

$$P_N = 0$$
$$P \cdot (1+r)N - A \cdot \frac{(1+r)^N - 1}{r} = 0$$
$$A \cdot \frac{(1+r)^N - 1}{r} = P \cdot (1+r)^N$$
$$A = P \cdot \frac{r \cdot (1+r)^N}{(1+r)^N - 1}$$

Thus, the amortization formula is:

$$A = P \cdot \frac{r \cdot (1+r)^N}{(1+r)^N - 1}$$

Moreover, from the amortization formula, the following can be determined:

Percent of Principal Paid Off $$\frac{(1+r)t - 1}{(1+r)N - 1}$$

Interest Accrued Between Periods—Interest Accrued from (t−1,t]

$$P \cdot \frac{r(1+r)N + (1+r)t - 1 - (1+r)t}{(1+r)N - 1}$$

Cumulative Interest—Interest Accrued from (0, t]

$$P \cdot \frac{rt(1+r)N + 1 - (1+r)t}{(1+r)N - 1}$$

As described above, the systems and/or methods described herein can use reverse amortization formulas to self-populate loan details (e.g., fields) even though not all of the information is provided. For example, in some instances, the system can calculate a length of a loan, T Specifically, the length of a loan, T, can be derived from the amortization formula, and is expressed below as:

$$T = \frac{1}{n \cdot \ln(1+r)} \cdot \ln\left(\frac{P \cdot (1+r)^t - P_t}{P - P_t}\right)$$

As such, the principal, P; the number of payments made (or number of months since the original loan date), t; the number of payments in a year, n; the annual percentage rate, R; and the balance remaining, $P_t$ can allow the system to calculate the length of the loan, T. By way of example:
P=$165,000 (original principal)
t=7 months
n=12 payments per year
R=4.5% APR
$P_T$=$163,461.82 (principal at month seven)
T=30.00004

In some instances, the system can calculate a payment amount. Specifically, the payment amount, A, is the amortization formula (expressed above). As such, the principal, P; the number of payments in a year, n; the annual percentage rate, R; and the length of the loan, T, can allow the system to calculate the length of the loan, T. By way of example:
P=$165,000
T=30
n=12
R=4.5%
A=$836.0308

In some instances, the system can calculate the original loan amount, P. Specifically, the original loan amount, P, can be derived from the amortization formula, and is expressed below as:

$$P = A \cdot \frac{\left(1 - (1+r)^{-N}\right)}{r}$$

As such, the payment amount, A; the number of payments in a year, n; the annual percentage rate, R; and the length of the loan, T, can allow the system to calculate the original loan amount, P. By way of example:

A=$836.03
T=30
N=12
R=4.5%
P=$164,999.80

In some instances, the system can calculate the interest rate. In general, directly solving for the interest rate may not be possible and thus, a root-finding function can be used. An example root-finding function is expressed below as:

$$f(x) = An\left(1 + \frac{x}{n}\right)^N - Px\left(1 + \frac{x}{n}\right)^N - An$$

where the interest rate, R, is the root of function $f(x)$. The function takes its maximum at:

$$K = \frac{n(AN - P)}{P(1 + N)}$$

In some instances, with the maximum, Newton's method of finding roots can be used to derived. With the interest rate, R, (root) being to the left of the maximum, the value at which the maximum occurs can be offset by a small amount as, for example, an initial guess and the algorithm can be iterated until a stopping condition. The iterative algorithm is expressed as:

$$p_n = p_{n-1} \frac{f(p_{n-1})}{f'(p_{n-1})}$$

where $p_0 = K + \delta$.

In some instances, $\delta$ can be chosen by trying a range of small values and seeing which one works for probable values of R. In simulation, R can be chosen from a 2·Beta (1.5, 4) distribution so that most simulated APRs are between 0 and 1, with the possibility of APRs up to 200%. For example, on a simulated set of 100,000 APRs, it can be determined that the APRs converged to the true APR within a tolerance of $8 \times 10^{-5} < 0.0001$. Since payments are paid using available currency, the accuracy is only need to 2 decimal places and thus, $\delta = 1/100$ works across all simulated APRs. As such, the iterative algorithm is expressed as:

$$p_n = p_{n-1} - \frac{(n + p_{n-1})\left(\left(\frac{n + p_{n-1}}{n}\right)^{-N} \cdot An - An + P \cdot p_{n-1}\right)}{P(N p_{n-1} + n + p_{n-1}) - ANn}$$

where a stopping condition is $|p_n - p_{n-1}| < $ tolerance, such as $1 \times 10^{-8}$.

As such, the principal, P; the payment amount, A; the number of payments in a year, n; and the length of the loan, T, can allow the system to calculate the annual percentage rate, R. By way of example:

P=165,000
A=836.03
T=30
N=12
p[1]=0.049302, first iteration; p[2]=0.045652, second iteration; p[3]=0.045018, third iteration;
p[4]=0.045, fourth iteration; p[5]=0.045, fifth iteration.
Thus, R=0.045 or 4.5%.

As described in detail above with reference to the system 100, in some instances, the separation, segmentation, and/or segregation of the metadata associated with a user of the system from the financial/loan data associated with the user (now anonymized) can increase an efficiency associated with performing such iterative processes and/or calculations (e.g., Newton's Method, Quasi-Newton Method, Levenberg-Marquardt, and/or the like). For example, the separation of the metadata from the financial/loan data can allow the financial/loan data to be processes, analyzed, and/or calculated using a GPU, FPGA, ASIC, etc. (e.g., the second processor 133 of the host device 130), which can have an architecture, instruction set, etc. well suited to perform such tasks (e.g., due to a high level of parallelization and/or other features or characteristics), as described above with reference to the system 100.

In some instances, the system can calculate the time elapsed since first payment date. Specifically, the time elapsed since the first payment date, t=1, can be derived from the amortization formula, and is expressed below as:

$$t = \frac{1}{\ln(1 + r)} \cdot \ln\left(\frac{(P - P_t)(1 + r)^N + P_t}{P}\right)$$

As such, the principal, P; the number of payments in a year, n; the length of the loan, T; the annual percentage rate, R; and the current balance, $P_t$ can allow the system to calculate the time elapsed since the first payment date, t=1. By way of example:

P=$165,000
T=30
n=12
$P_t$=$134,825.99

Assuming the current balance, $P_t$, is calculated just after making a scheduled monthly payment in April 2019, the time elapsed since the first payment is t=112 (in months). Thus, the system can determine that the loan was taken out in December 2009.

In some instances, the system can calculate the balance at a given time, such as, for example, after a given number of payments. Specifically, the current balance at time t, $P_t$, can be derived from the amortization formula, and is expressed below as:

$$\frac{A}{P} = \frac{r}{1 - (1 + r)^{-N}}$$

which can be simplified and expressed as:

$$P_t = P - P \cdot \frac{(1 + r)^t - 1}{(1 + r)^N - 1}$$

As such, the principal, P; the time since the original loan data, t; number of payments in a year, n; the annual percentage rate, R; and the length of the loan, T, can allow the system to calculate the current balance at time t. By way of example:

P=$165,000
T=30
n=12
t=1
P[1]=163,238.80

These formulas and examples presented above were verified, for example, by running test cases. Although the formula rounds certain values, the formulas have been verified to work in all situations. The verification is attached hereto as Exhibit A.

In some embodiments, the systems, host devices, servers, etc. can be configured to execute instructions and/or code stored in a memory associated with performing the mathematical operations described in the formulas above. The systems, host devices, servers, etc. can, for example, take just the three fields and can auto populate the rest of the desired information through the formulas using, for example, JavaScript logic and functions (or other suitable programming language(s) or instructions), and then outputs the data (e.g., via a user interface). Furthermore, the output of this function can then be modified and utilized to set up an automated set of payments to banks. That is to say, the systems, host devices, servers, etc. can be configured to perform one or more actions and/or make one or more payments in accordance with one or more simulations performed for a user (e.g., based on a user instruction to do so). In some implementations, an application programming interface (API) and a set of tools for Linux or any other host/server device have been and/or can be developed to automate the storage, computation, management, structuring and delivery of data to the end-user.

The formulas and examples described above demonstrate one example of information used to calculate all the data desired loan data. The value of this complete data is that it is used for calculating and showing the consumer/user the savings of interest (money), and time as well as the actual payoff date. In some instances, providing the consumer/user with such information can have measurable effect on user retention and consumer/user conversion on, for example, a registration page. For example, if a consumer is required to enter all six data fields in order to register and use the programs, calculator, and resulting data of time and money saved, there might be less than 10% retention upon first visit to the site and attempt to register. This small retention is due to lender and data access online, and those with physical files at hand. Of the remaining 90%, on average only 25-30% will come back within 48 hours. The likelihood of the remaining 60% returning at all is 50/50. This is at most a 60% conversion to registration of unique visitors desiring to register (e.g., a 40% loss of potential users). On the other hand, as a result of the application of the formulas as described, and the minimal amount of data provided by the consumer/user's intent to register, those numbers are affected as follows. First visit, 36% conversion to completed registration. And an additional 42% within 48 hours, and 18% likely in the future (e.g., over a 96% consumer retention and conversion to registration).

In some instances, the formulas can provide and/or result in six pieces of data used to give the consumer/user a real time snapshot of the loan. In the snapshot, the consumer/user sees the time left on the loan and the remaining scheduled interest to be paid. In addition, the consumer/user can select between one or more of six different payment simulations, namely, "OneDayEarly," "LeapFrog," "JumpStart," "FlexPay," "RoundUp," and "DoubleDown," as described in detail above with reference to FIG. 5. In some implementations, simulated results can appear real time on or in a user's mortgage snapshot.

In some instances, the systems and/or methodology is implemented when the user chooses a program (just described) and an extra principal payment or payments are scheduled through the system. In addition to the simulations, the system can provide a platform configured to receive payments from the consumers/users and to make payments on behalf of the consumers/users. In general, the systems and/or methods described herein include making any extra principal payments "a day early" (such as, for example, on the day prior to the calculation of interest for the next billing/payment cycle). In general, payment on the day before the start of the next payment/billing cycle ("a day early"), regardless of differences in time zones, etc., call allow a consumer to save the following month's interest on the amount paid a day early. This savings continues exponentially. In some implementations, the consumer/user has additional options of making addition principal payment(s) on "a day early" and/or otherwise just before the calculation of the interest for the next payment/billing cycle though one of the six programs and/or otherwise according to one of the six simulations, described above and/or making a regularly scheduled payment within the grace period and scheduling an extra principal payment to be paid "a day early."

A third option is to make the regular scheduled payment within the grace period, along with an extra principal payment at the same time. This is being paid earlier than the end of the billing, which in some instances, is more efficient. For this option, an agreement can be reached with the consumer/user and/or between the consumer/user and the consumer/user's bank whereby the bank adds extra to the principal payment added to the regularly scheduled amortized payment paid by the customer. This extra comes to the customer in the form of interest with the consumer's bank, and/or customer relations whereby the bank pays the customer to open an account. For these accounts which may include auto payroll deposits, auto bill pay, and sitting deposits for the life of the customers amortized loan(s) being accelerated. For example, in some implementations, the bank can pay an extra $1 each month for earlier payment of the extra principal. In this example and with the average life of a 30-year mortgage being 2-5 years due to refinancing and/or sales, the exposure to the bank is only $24-$60 on average. The maximum exposure on a 30-year loan would be $360, for which the bank would have a 30 year banking relationship with 30 years auto payroll deposits, 30 years of auto bill pay, and 30 years of deposits.

While the systems and methods are described above as being implemented to make loan payments "a day early" or otherwise just prior to the calculation of the next month's interest, the systems and/or methods can be implemented in any suitable manner. For example, in some instances, the system can be used, for example, by banks or financial institutions to give their customers access to their payroll funds a day earlier than their payday, or in some cases 2 days earlier based on federal notifications and customer relationship. In some instances, such an implementation, for example, can be a natural relationship builder for the customer and the banks, the customer and the operator(s) of the system, and the operator(s) of the system and the bank. In some instances, such an implementation can parallel the implementation of making early and/or extra principal payments allowing for increased flexibility and/or increased efficiency.

In some embodiments, the systems and/or methods described herein can be implemented in a server/user and/or host/client environment. In other embodiments, the systems and/or methods described herein can be implemented in a peer-to-peer environment, which can accommodate and/or facilitate real time money transfers to users of the system who can then use the money immediately for extra principal payment, or any other individual purpose.

At this point, a program can be implemented, and payment can be sent to the user's lender, whether directly or through a new bank relationship as bill pay. Understanding there are only 12 days a year that amortization is recalculated (e.g., at the end of a monthly payment/billing cycle for each month of the year), the payments are made and at the end of each month, the interest rate is applied to the balance at that time. The result of the calculation determines the interest portion of the fixed amortized payment. The difference of that new interest portion and the scheduled fixed payment is applied to the principal, reducing the loan balance by that amount for the next month's calculation. In staying within the methodology described herein, the system (e.g., the system 100), on behalf of the users, can make any extra principal paydowns at or by the end of a payment/billing cycle for each month (e.g., at month's end and/or on any predetermined day depending on the agreed to cycle). While the payment is described as being made on the day before the start of the next cycle, it should be understood that this is presented by way of example only and not limitation. The payment date may, in some instances, be moved as far forward to the actual moment of amortization calculation. In some instances, the moment of calculation can be provided by a financial institution or can be calculated, inferred, and/or otherwise determined based on data (e.g., loan data, banking data, interest rate data, market data, transactional data, national or international standards data, industry standards data, user-provided data, etc.).

Figure 7:
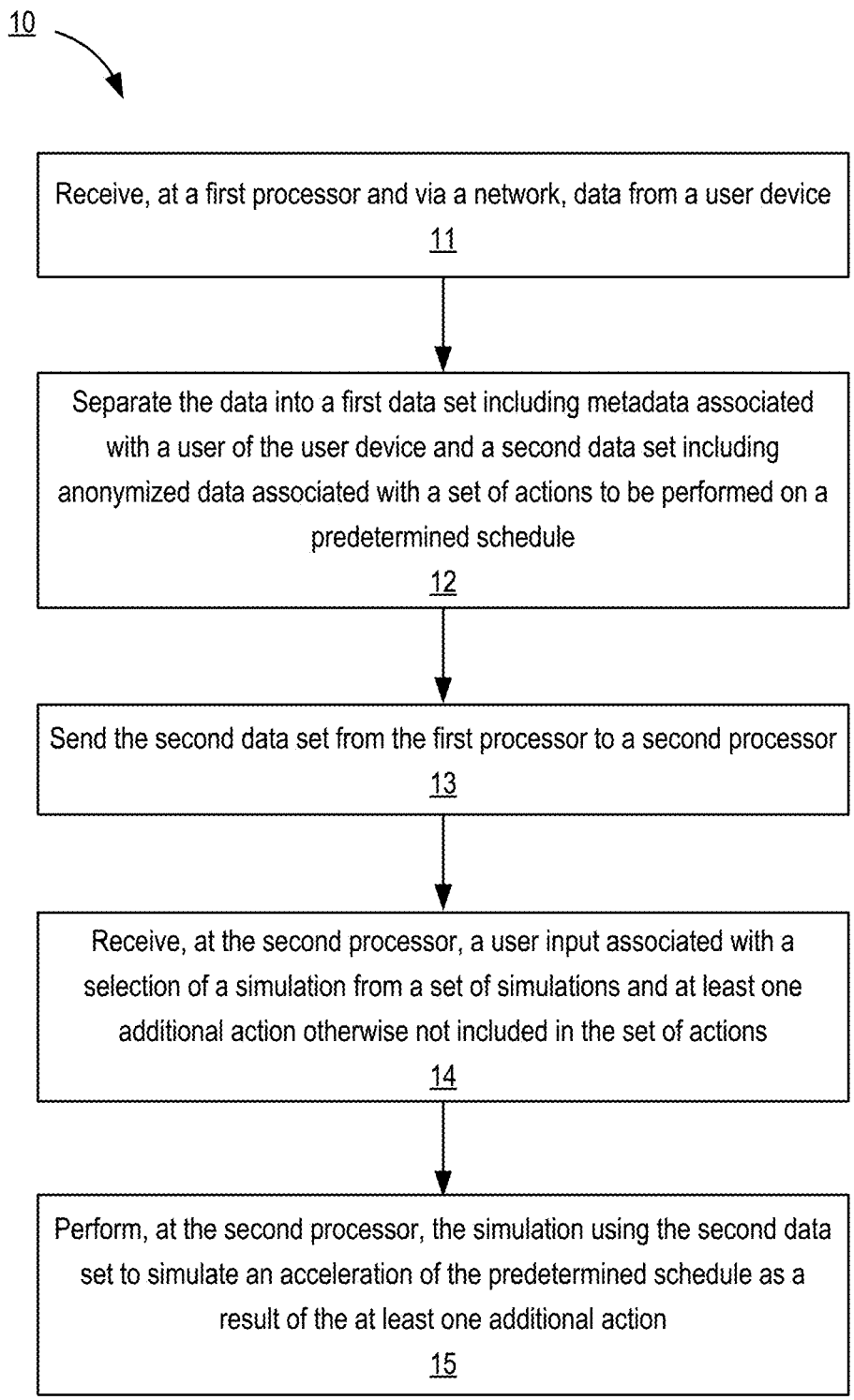
FIG. 7 is a flowchart illustrating a method of anonymizing sensitive data and simulating accelerated schedule parameters using the anonymized data, according to an embodiment.

Referring now to FIG. 7, a flowchart is shown describing a method 10 of anonymizing sensitive data and simulating accelerated schedule parameters using the anonymized data. The method 10 can be implemented in any of the systems, devices, and/or components described herein. For example, in some implementations, the method 10 can be performed in, on, or by the system 100 described above with reference to FIGS. 1-6. In some implementations, the method 10 includes receiving, at a first processor and via a network, data from a user device, at 11. For example, the user device can be one or more of the user devices 120 and the network can be at least a portion of the network 105 described above with reference to the system 100. Similarly, the first processor can be similar to or substantially the same as the first processor 132 of the host device 130.

The data is separated into a first data set including metadata associated with a user of the user device and a second data set including anonymized data associated with a set of actions to be performed on a predetermined schedule, at 12. For example, in some implementations, the first processor 132 can be configured to analyze and/or evaluate the data received from the user device and can separate the data into a first data set including the metadata associated with the user and a second data set including the anonymized data associated with the set of actions to be performed on the predetermined schedule. As described in detail above, the first processor 132 can further be configured to organize the data such that the metadata is stored in a first data structure and the anonymized data is stored in a second data structure different from the first data structure. The second data set is devoid of the user metadata and therefore, is considered "anonymized." Moreover, in some implementations, the anonymized data can be, for example, amortized loan data associated with at least one loan associated with, contemplated by, and/or taken out by the user of the user device. The amortized loan data can include data associated with and/or otherwise detailing, for example, a predetermined loan repayment schedule, as described in detail above. In some implementations, the separation and/or segmentation of the data can increase a level of data privacy by, for example, decoupling a user's personally identifiable information (PII) from the user's financial and/or loan data, as described in detail above.

The second data set is sent from the first processor to a second processor, at 13. As described in detail above, in some implementations, the first processor can be, for example, a CPU that can be configured to perform tasks on a wide-range of data but that may be limited on an amount and/or level of parallelization and the second processor can be, for example, a GPU and/or the like that can be configured to perform tasks on a narrow-range of data but that has a substantially higher capacity for parallelization. As such, the host device can be configured to utilize the capacity and/or capability of the second processor to process the second data set that is organized into the second data structure.

The second processor receives a user input associated with a selection of a simulation from a set of simulations and an indication of at least one additional action otherwise not included in the set of actions to be performed on the predetermined schedule, at 14, and after receiving, the second processor performs the simulation from the set of simulations using the second data set, at 15. The simulations are configured to simulate an acceleration of the predetermined schedule as a result of the at least one additional action. For example, in some implementations, the set of simulations can be simulations for accelerating a schedule for repaying an amortized loan by making at least one payment applied to the principal of the loan that is in addition to the scheduled (amortized) payments. Furthermore, the simulations can simulate the additional payment being applied against the principal "a day early" and/or otherwise at most 24 hours prior to the calculation of interest for the next payment period (e.g., the next month), as described in detail above with reference to specific examples. In some implementations, the method 10 can further include sending the results of the simulation to the user device, thereby allowing the user to review potential financial savings and/or time savings resulting from the additional payment application to the principal of the loan. In some implementations, the method 10 can further include a platform and/or interface for allowing the user to implement the simulated accelerated loan scenario, as described in detail above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM)

and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, an FPGA, an ASIC, and/or the like. Software modules (executed on hardware) can be expressed in a variety of software languages (e.g., computer code), including C, C++, Java™, JavaScript, Ruby, Visual Basic™, Python™, Hypertext Markup Language (HTML), Cascading Style Sheets (CS S), Lua, Bourne Shell (BASH), and/or the like or equivalents thereof and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools, and/or combinations thereof (e.g., Python™). Additional examples of computer code include, but are not limited to, control signals, encrypted code, and compressed code.

Many different systems can implement the method of the present invention. Moreover, the steps of the present method could occur at different parts of a system, at a single part of a system, in parallel across the system, or in any other fashion. Moreover, certain embodiments of the invention are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction that implement the acts specified herein. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

The various illustrative logical blocks, modules, circuits, and algorithm steps described in connection with the embodiments disclosed herein can be implemented as electronic hardware, computer software, or combinations of both. The various illustrative logical blocks, modules, and circuits described in connection with the embodiments disclosed herein can be implemented or performed with a general purpose processor, a digital signal processor (DSP), an ASIC, a field programmable gate array (FPGA) or other PLD, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices (e.g., a combination of a DSP and a microprocessor, one or more microprocessors, one or more microprocessors in conjunction with a DSP core, or any other such configuration).

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Some embodiments, systems, and/or methods described herein can use predetermined, predefined, and/or otherwise commercially available libraries that can include but are not limited to Ubuntu Linux Server (alternatively, an equivalent Linux OS such as Red Hat), QEMU (alternatively, an equivalent hypervisor such as VMWare ESXi), NginX (alternatively, an equivalent HTTP server such as Apache), React (alternatively, an equivalent web user interface framework such as Angular), Bootstrap (alternatively, an equivalent responsive web development framework such as Foundation), Redis (alternatively, an equivalent key-value database such as Aerospike), MySQL (alternatively, an equivalent structured database such as Postgres), Torch (alternatively, an equivalent machine learning toolkit such as TensorFlow), Cuda (or other similar libraries), and/or the like, and/or combinations thereof. In addition to libraries, software, and/or databases, several standardized functions and algorithms can be used, which can include, but are not limited to, MD5, SHA256, HMAC, bloom filters, and/or the like. While specific examples are listed above, it should be understood that this is not an exhaustive list and any library, function, software, database, etc. could be replaced with other libraries, functions, software, databases, etc. with similar functionality and purpose.

Some embodiments, systems, and/or methods described herein can be and/or can execute a platform with one or more application programming interface (API) powered client application(s) including but not limited to native desktop applications, native mobile applications, and/or web-based applications for general web browser usage. Compatible web browsers can include but are not limited to Chrome, Mozilla, Safari, Edge, Opera, etc. Compatible operating systems can include Windows, Mac OS X, iOS, Android, Unix, Linux, and/or the like using their respective SDKs. In some implementations, any of the embodiments described herein can be run on and/or can be an instance on a Ubuntu Linux Server, and/or the like. In some implementations, the system and/or methods can be performed by and/or can be hosted on a hybrid server infrastructure including cloud instances similar to those found on Amazon Web Services and/or bare metal servers in a data center. In other implementations, the system and/or methods can be performed by and/or can be hosted on any of the host devices and/or servers described herein.

The subject matter recited in the claims is not intended to be coextensive with and should not be interpreted to be coextensive with any implementation, feature, or combination of features described specification or illustrated in the drawings. This is true even if only a single implementation of the feature or combination of features is illustrated and described. Any of the systems, devices, and/or embodiments described herein can include any of the features and/or aspects described herein, and/or can be implemented in any of the scenarios described herein. For example, in some implementations, any of the systems and/or methods described herein can be used by, for, and/or with consumers, user, and/or homeowners with amortized mortgage(s), and/or consumers that are potential future homeowners, all planning and/or striving to be debt free and/or seeking ways to reduce the length or repayment obligation of debt.

While various embodiments have been particularly shown and described, it should be understood that they have been presented by way of example only, and not limitation. Various changes in form and/or detail may be made without departing from the spirit of the disclosure and/or without altering the function and/or advantages thereof unless expressly stated otherwise. Where schematics and/or embodiments described above indicate certain components arranged in certain orientations or positions, the arrangement of components may be modified.

Although various embodiments have been described as having particular features and/or combinations of components, other embodiments are possible having a combination of any features and/or components from any of embodiments described herein, except mutually exclusive combinations. The embodiments described herein can include various combinations and/or sub-combinations of the functions, components, and/or features of the different embodiments described.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed:

1. An apparatus, comprising:
a memory;
a communication interface configured to send and receive data via a network;
a first processor configured to receive, via the communication interface and the network, data from a user device, the first processor configured to separate the data into a first data set and a second data set, the first data set including metadata associated with a user of the user device and at least a portion of the second data set including anonymized data associated with a set of actions to be performed on a predetermined schedule; and
a second processor different from the first processor, the second processor configured to receive the second data set from the first processor,
the second processor configured to receive a user input associated with a selection of a simulation from a plurality of simulations and at least one additional action otherwise not included in the set of actions to be performed on the predetermined schedule, and
the second processor configured to perform the simulation from the plurality of simulations using the second data set, the simulation from the plurality of simulations configured to simulate an acceleration of the predetermined schedule as a result of the at least one additional action.

2. The apparatus of claim 1, wherein the first processor is a central processing unit (CPU) and the second processor is a graphics processing unit (GPU).

3. The apparatus of claim 1, wherein the first data set is stored in the memory in a first data structure and the second data set is stored in the memory in a second data structure separate from the first data structure.

4. The apparatus of claim 1, wherein the memory is a first memory including a first database, the first processor being configured to store the first data set as a first data structure within the first database, the apparatus further comprising:
a second memory separate from the first memory, the second memory includes a second database separate from the first database, the second processor being configured to store the second data set as a second data structure within the second database.

5. The apparatus of claim 1, wherein:
the second processor is configured to send to the first processor data representing a result of performing the simulation from the plurality of simulations, and
the first processor is configured to send data representing the result to the user device via the network and the communication interface.

6. The apparatus of claim 1, wherein the set of actions to be performed on the predetermined schedule is a set of loan repayments and the predetermined schedule is a predetermined loan repayment schedule,
the at least one additional action is at least one additional payment of a user-defined amount to be applied against a principal of the loan, and
the simulation from the plurality of simulations simulates an acceleration of the loan repayment schedule as a result of the at least one additional payment of the user-defined amount to be applied against the principal of the loan.

7. A non-transitory processor-readable medium storing code representing instructions to be executed by a first processor and a second processor different from the first processor, the instructions comprising code to cause the first processor to:
receive data from a user device via a network;
separate the data into a first data set and a second data set, the first data set including metadata associated with a user of the user device and at least a portion of the second data set including anonymized data associated with a set of actions to be performed on a predetermined schedule; and
the instructions further comprising code to cause the second processor to:
receive the second data set from the first processor;
receive a user input associated with a selection of a simulation from a plurality of simulations and at least one additional action otherwise not included in the set of actions to be performed on the predetermined schedule; and
perform the simulation from the plurality of simulations using the second data set, the simulation from the plurality of simulations configured to simulate an acceleration of the predetermined schedule as a result of the at least one additional action.

8. The non-transitory processor-readable medium of claim 7, wherein the code to cause the second processor to receive the user input includes code to cause the second processor to receive the user input from the first processor.

9. The non-transitory processor-readable medium of claim 7, wherein the code to cause the second processor to receive the user input includes code to cause the second processor to receive the user input via the network.

10. The non-transitory processor-readable medium of claim 7, wherein the instructions further comprising code to cause the first processor to store the first data set in a first database, the first data set having a first data structure; and
the instructions further comprising code to cause the second processor to store the second data set in a second database separate from the first database, the second data set having a second data structure different from the first data structure.

11. The non-transitory processor-readable medium of claim 7, wherein the instructions further comprise code to cause the second processor to send data representing a result of performing the simulation from the plurality of simulations to the first processor, and
the instructions further comprising code to cause the first processor to send data representing the result to the user device via the network and the communication interface.

12. The non-transitory processor-readable medium of claim 7, wherein the set of actions to be performed on the predetermined schedule is a set of loan repayments and the predetermined schedule is a predetermined loan repayment schedule,
the at least one additional action is at least one additional payment of a user-defined amount to be applied against a principal of the loan, and
the simulation from the plurality of simulations simulates an acceleration of the loan repayment schedule as a result of the at least one additional payment of the user-defined amount to be applied against the principal of the loan.

13. A method, comprising:
receiving, at a first processor and via a network, data from a user device;
separating the data into a first data set including metadata associated with a user of the user device and a second data set including anonymized data associated with a set of actions to be performed on a predetermined schedule;
sending, from the first processor and to a second processor, the second data set;
receiving at the second processor a user input associated with a selection of a simulation from a plurality of simulations and at least one additional action otherwise not included in the set of actions to be performed on the predetermined schedule; and
performing at the second processor the simulation from the plurality of simulations using the second data set, the simulation from the plurality of simulations configured to simulate an acceleration of the predetermined schedule as a result of the at least one additional action.

14. The method of claim 13, wherein the first processor is a central processing unit (CPU) and the second processor is a graphics processing unit (GPU).

15. The method of claim 13, wherein the receiving at the second processor the user input includes receiving the user input from one of the first processor or from the user device via the network.

16. The method of claim 13, further comprising:
storing the first data set as a first data structure in a first database;
storing the second data set as a second data structure different from the first data structure in a second database separate from the first database; and
storing data associated with the performing of the simulation from the plurality of simulations in the second database.

17. The method of claim 13, further comprising:
sending, to the user device and via the network, data representing a result of the performing the simulation from the plurality of simulations.

18. The method of claim 13, wherein the receiving the data from the user device includes receiving at least a portion of loan data associated with an amortized loan and the metadata associated with the user of the user device, the method further comprising:
analyzing the portion of the loan data to define loan parameters absent from the portion of the loan data; and
defining the second data set based on the analyzing, the second data set including loan data and satisfying a predetermined criteria, the second data set being devoid of metadata associated with the user,
the data associated with the set of actions to be performed on the predetermined schedule included in the second data set is data associated a set of loan repayments to be performed on a predetermined loan repayment schedule.

19. The method of claim 13, wherein the receiving the data from the user device includes receiving at least a portion of loan data associated with an amortized loan and the metadata associated with the user of the user device, the method further comprising:
analyzing the portion of the loan data to define at least one loan parameter absent from the portion of the loan data, the loan parameters including a loan term, a payment amount, an original loan amount, an interest rate of the loan, a first payment date, and a balance at a predetermined time, the data received from the user device; and
defining the second data set based on the analyzing, the second data set including the loan parameters and being devoid of metadata associated with the user.

20. The method of claim 13, wherein the set of actions to be performed on the predetermined schedule is a set of loan repayments and the predetermined schedule is a predetermined loan repayment schedule,
the at least one additional action is at least one additional payment of a user-defined amount to be applied against a principal of the loan, and
the simulation from the plurality of simulations simulates an acceleration of the loan repayment schedule as a result of the at least one additional payment of the user-defined amount to be applied against the principal of the loan.

* * * * *